US012647746B2

(12) United States Patent
Edwards

(10) Patent No.: US 12,647,746 B2
(45) Date of Patent: Jun. 2, 2026

(54) SYSTEMS AND METHODS FOR SPATIALLY ENHANCED AUDIO COMMUNICATIONS

(71) Applicant: Adeia Guides Inc., San Jose, CA (US)

(72) Inventor: Warren Keith Edwards, Atlanta, GA (US)

(73) Assignee: Adeia Guides Inc., San Jose, CA (US)

( * ) Notice: Subject to any disclaimer, the term of this patent is extended or adjusted under 35 U.S.C. 154(b) by 488 days.

(21) Appl. No.: 18/128,375

(22) Filed: Mar. 30, 2023

(65) Prior Publication Data

US 2024/0334148 A1 Oct. 3, 2024

(51) Int. Cl.
*H04S 7/00* (2006.01)

(52) U.S. Cl.
CPC .......... *H04S 7/304* (2013.01); *H04S 2420/01* (2013.01)

(58) Field of Classification Search
CPC ...... H04S 7/304; H04S 2420/01; H04S 7/303; H04S 2400/11; H04R 3/12
USPC .......................................................... 381/310
See application file for complete search history.

(56) References Cited

U.S. PATENT DOCUMENTS

2018/0091922 A1 3/2018 Satongar et al.
2018/0317035 A1* 11/2018 Hayashi .................. H04S 3/008
2020/0007988 A1 1/2020 Raj
2021/0084424 A1* 3/2021 Chon ......................... H04S 7/30
2022/0345820 A1* 10/2022 Dickins .................. G06N 20/00
2022/0386026 A1 12/2022 Singh et al.
2023/0325807 A1 10/2023 Suzuki
2025/0097661 A1* 3/2025 Kakargola ............ H04M 3/568

OTHER PUBLICATIONS

"SpotFi: Decimeter Level Localization Using Wi-Fi." Manikanta Kotaru, Kiran Joshi, Dinesh Bharadia, Sachin Katti. SIGCOMM '15, Aug. 17-21, 2015. London, United Kingdom.
Arons, B. (1992). A Review of the Cocktail Party Effect. Journal of the American Voice I/O Society, 12(7), pp. 35-50, 1992.
Burgess, D.A. (1992). Techniques for Low-Cost Spatial Audio. In Proceedings of the Fifth ACM Symposium on User Interface Software and Technology (UIST). Monterey, CA. Nov. 1992.
Drewes, T., Mynatt, E., & Gandy, M. (2000). Sleuth: An audio experience. In Proceedings of The International Conference on Auditory Display.
Driver, J. (2001). A Selective Review of Selective Attention Research from the Past Century. Br. J. Psychology, 92. pp. 53-78.
Gardener, M.B. (1973). Some Monaural and Binaural Facets of Median Plane Localization. J. Acoustic Soc. Am., 54, pp. 1489-1495.
Mills, A.W. (1972) Auditory Localization. Foundations of Modern Auditory Theory, vol. II/8, Academic: New York, NY.

(Continued)

*Primary Examiner* — Carolyn R Edwards
*Assistant Examiner* — Friedrich Fahnert
(74) *Attorney, Agent, or Firm* — HG LAW LLP

(57) ABSTRACT

Systems and methods are described herein for enhanced audio delivery using a device. When a device receives a notification, the device may determine a spatial location to render the notification based on various parameters that are assigned to or derived from the notification. The device may render multiple audio streams and may present those streams to different ears of the user to simulate a spatial origin for the notification.

20 Claims, 18 Drawing Sheets

(56) References Cited

OTHER PUBLICATIONS

Naef, M., Staadt, O., and Gross, M. (2002) Spatialized Audio Rendering for Immersive Virtual Environments. In Proceedings of the ACM Symposium on Virtual Reality Software and Technology (VRST). ACM Press, NY, NY. pp. 65-72.
Rayleigh, L. [Strutt, J.W.] (1907) On Our Perception of Sound Direction, Phil. Mag., 13, pp. 214-232.
Searle, C.L., Braida, L.D., Davis, M.F., and Colburn, H.S. (1976) Model for Auditory Localization. J. Acoustic Soc. Am., 60, pp. 1164-1175.
U.S. Appl. No. 18/128,376, filed Mar. 30, 2023, Warren K. Edwards.

* cited by examiner

300

302

```
def rule1(message):
    If message.application == "Mail"
        Message.position = 90°
        Message.distance = 5 meters
        Message.voice = "Female British"
        Message.volume = Medium
    If message.application == "Timer"
        Message.position = 0°
        Message.distance = 2 meters
        Message.voice = "Male American"
        Message.volume = High
```

304

```
def rule2(message):
    If message.private == True:
        Message.position = 180°
        Message.distance = 0.1 meters
        Message.volume = Whisper
```

FIG. 3

600

| Target Object Name | Category | Address | Location |
|---|---|---|---|
| Living Room Nest Thermostat | Smart | 192.168.1.29 | 32.98, 57.15, 4.2 meters |
| Ecobee Outlet | Smart | 192.168.1.15 | 75.14, -62.58, 12.9 meters |
| Filing Cabinet | Dumb | N/A | -84.72, 45.09, 8.3 meters |

602

604

606

FIG. 6

900

902

| Command Utterance | User Identity | Relative Direction |
|---|---|---|
| "Set a timer" | Steve | $\Phi_1, \lambda_1$ |
| "What's the score?" | Helen | $\Phi_2, \lambda_2$ |

904

| Feedback | Relative Position |
|---|---|
| "Timer is set" | $\Phi_1, \lambda_1, d_1$ |
| "Score is 35 to 7" | $\Phi_2, \lambda_2, d_2$ |

FIG. 9

SYSTEMS AND METHODS FOR SPATIALLY ENHANCED AUDIO COMMUNICATIONS

BACKGROUND

This disclosure is generally directed to systems and methods for spatially enhancing audio communications. In particular, systems and methods are provided that select a perceived location for an audio output based on a feature of a message.

SUMMARY

While voice capable devices, such as voice assistants, have been gaining in popularity, they lack a natural means to convey contextual information about the messages they provide without providing such context as speech. For example, in a smart home, a voice assistant may receive a variety of notifications from a variety of devices and applications. Each of the notifications, and each of the devices that originate each of the notifications, may be associated with specific locations in the home and/or specific applications. For example, a voice assistant may receive a notification for a timer going off in the kitchen, a notification for a hallway thermostat activating a heater, and/or a notification for a new email from an email application. In some instances, each of these devices and applications transmits notifications to a voice assistant to output audio of the notification. For example, the voice assistant may generate the audio notification "Kitchen timer has ended" in response to receiving a notification that the kitchen timer has ended, or the notification "New email from Outlook" in response to receiving a new email notification from the Outlook application. The source device (e.g., the kitchen timer) and/or application (e.g., Outlook) must be explicitly identified by the voice capable device as it does not have any other means for providing context for the notification.

Typically, humans make use of the spatial locations of sound sources associate the sound with its root cause. For example, a user may be located within their home where the kitchen is located on their right side and their laundry room is located on their left side. The user may have a first timer set in their kitchen (e.g., for a roast turkey) and a second timer set in their laundry room (e.g., for a load of laundry). When the user hears a timer trigger on their right side, the user will use the spatial location of the sound to determine that the first timer (e.g., in the kitchen) is sounding for the roast turkey as opposed to the second timer for the laundry. However, current voice capable devices do not leverage sound location at all, despite the fact that much of the information the voice capable devices present may be associated with a particular location.

In other instances, voice capable devices may provide notifications to multiple users within an environment. For example, a first user may ask the voice capable device to set a first timer in the kitchen, and a second user may ask the voice capable device to set a second timer in the kitchen. When the first timer ends, the voice capable device may generate the audio notification "Kitchen timer for the first user has ended." The voice capable device must explicitly identify both the source of the timer (e.g., the Kitchen) and the user that requested the timer (e.g., "the first user") to provide context for the audio notification without confusing both users. Current voice capable devices do not leverage sound location to target notifications to specific intended recipients.

Accordingly, the systems and methods herein provide for a voice capable device that provides contextual information for a communication via spatialized audio. Due to the perceptual properties of spatial audio, humans are able to extract location information from sound without having to consciously attend to the process. Further, and particular to speech user interfaces, spatialized speech audio allows humans to selectively attend to multiple audio streams, an ability that is not possible when speech is presented via normal stereo or monophonic sources without spatialization. For example, a human can tune in to, or focus their auditory attention on a particular auditory stimulus when that auditory stimulus is presented at a location that is different from the other auditory stimuli. For example, a user can tune in to a voice of another user when the voice of that user is spatially distinct from the voices of other users. The use of spatialized sound streams can reduce cognitive burden on users, allowing for a more natural and fluid interaction style with voice capable devices.

The systems and methods presented herein enable a voice capable device (e.g., a voice assistant) to communicate with users by providing context for various messages using spatially localized audio corresponding to the message and/or context of the message. In some embodiments, the systems and methods provided herein receive a communication wherein the communication is associated with a message and a communication characteristic. For example, a voice capable device may receive a notification, such as a notification that a kitchen timer has ended, comprising a message (e.g., that the timer has ended) and a communication characteristic (e.g., an indication that the communication is from the kitchen timer and/or that the communication is intended for a first user).

In some embodiments, the communication characteristic is at least one of an origin device of the communication (e.g., the kitchen timer), an originating application of the communication (e.g., a cooking application on the kitchen timer), a priority of the communication (e.g., a high priority because the turkey will burn if the timer is not attended to quickly), a time sensitivity for the message (e.g., the message must be delivered as soon as the timer finishes), a privacy level for the message (e.g., a normal privacy level for the timer because other household members know the turkey is cooking, as compared to an overdraft notice which may have an elevated privacy level), etc.

In some embodiments, the voice capable device selects a spatial location for the message based on the communication characteristic. For example, the voice capable device may store (e.g., in a database) location-based rules corresponding to each communication characteristic. The location-based rules may associate a respective communication characteristic with at least one of a spatial direction and/or a spatial distance. For example, a communication may be associated with a first communication characteristic identifying the banking application and a second communication characteristic identifying a privacy level for the message (e.g., private).

The location-based rule stored in association with the banking application and/or the privacy level may identify a spatial direction and/or spatial distance for the notification. For example, the voice capable device may determine, based on the communication characteristic, that all notifications from the banking application should appear on a right side of the user and, because the notification is associated with the "private" communication characteristic, that the notification should be rendered spatially close to the user (e.g., so that other users cannot hear the notification or to seem as if the notification is being whispered to the user). In some embodiments, the voice capable device selects at least one of a volume, tone or speaking cadence for the output of the message based on the communication characteristic. For example, the voice capable device may select a whisper voice for a notification with a "private" communication characteristic so that others cannot hear the output of the notification.

In some embodiments, the voice capable device selects, based on a communication characteristic of the message, a spatial location for the message relative to a location of the recipient and/or a location of a physical object. For example, a communication characteristic may be an origin object of the communication (e.g., a timer on a kitchen stove). The voice capable device may retrieve the communication and may determine that an origin of the communication is associated with a particular object (e.g., a kitchen timer).

Based on the origin of the communication (e.g., the kitchen timer), the voice capable device may identify a location of the origin device relative to a location of the recipient (e.g., the user of the voice capable device). For example, the voice capable device may determine that the kitchen timer is located in a rightward direction relative to the user. In response to determining the direction of the object, the voice capable device may generate the sound corresponding to a message by the kitchen timer in a rightward direction from the user. For example, the voice capable device may generate an alarm sound that, as perceived by the user, is spatially located to the right of the user. Because the voice capable device is able to spatially place the sound such that it seems to originate from a direction of the originating device, the user may determine that the timer sound is for a kitchen timer as opposed to a laundry timer (e.g., based on the spatial location of an origin for the sound) without the voice capable device explicitly announcing the origin device of the notification.

In some embodiments, the voice capable device may determine the location of the object based, at least in part, on a wireless signal from the object. For example, the object may be equipped with an ultra-wide band (UWB)-capable radio. One or more devices may identify a location of the object based on a signal from a UWB radio of the object. For example, one or more fixed location UWB-capable devices, such as a router, a wall-mounted sensor, etc., may determine the location for the object based on a time of flight of the signal from the object to the one or more fixed location devices and/or the angle of arrival of the signal. Based on a difference between the time-of-flight signals, the voice capable device (or a third-party device, such as a server or a router) may determine a location for the object (e.g., the kitchen timer). In some embodiments, the location of the object (e.g., the kitchen timer) may be computed relative to a location of the voice capable device. In such instances, the one or more fixed location devices may compute the location of the voice capable device and may identify a location of the object relative to the voice capable device.

In some embodiments, the voice capable device may enable devices that do not have the ability to share their location to provide spatialized audio. Devices that do not have the ability to share their location may include, for example, "dumb" devices that do not have any network capabilities (e.g., a standard light switch), or may include devices that have network capabilities (e.g., ethernet or Wi-Fi capabilities), but do not have a means for reliablely sharing the location of the object. For example, a user's oven may not have voice capabilities, but may be connected to an ethernet network.

The voice capable device may enable voice capabilities for the oven by storing a physical location of the oven within the user's home, then projecting notifications that pertain to the oven from that physical location by rendering spatial audio that corresponds to the physical location. In some embodiments, the voice capable device facilitates output of audio notifications for the physical object in response to detecting that the physical object does not have audio output capabilities (e.g., by detecting that the object does not have a speaker or that the object is not associated with a voice assistant).

In some embodiments, the voice capable device may identify the location of the physical object based on the location of a second device. For example, the voice capable device may determine when a portable device, such as a user's mobile phone, is within a proximity of the physical object, such as an oven, based on a wireless signal from the object (e.g., a short-range wireless signal, such as NFC), a visual detection of the object (e.g., by detecting the object itself or a QR code displayed on the object), a predefined association with a secondary device (e.g., an wireless tag assigned to the object), etc. Based on the location of the portable device, the voice capable device may store, in a database, an association between an identifier for the object (e.g., a name, model, MAC, or IP address) and the physical location of the portable device (e.g., using a UWB radio of the mobile phone). Accordingly, the voice capable device may use a second device as a proxy for the location of an object that otherwise cannot provide its location.

In some aspects, the voice capable device renders a first audio signal and a second audio signal comprising the message. For example, the voice capable device may synthesize the message to audio. In one example, when the message is that a timer has ended, the message may be an alarm sound. In another example, when the message is that a user's bank account is overdrawn—the message may be "Bank account overdrawn." In such instances, the audio signals may comprise an audio synthesis of text (e.g., using text to speech).

The voice capable device may render a different first audio signal from the second audio signal so that the user perceives that the sound originates from a particular location (e.g., the spatial location). For example, a user may perceive that a sound originates out of a specific location when there is a particular time delay difference, intensity difference and phase difference between the first audio signal and the second audio signal. This time delay difference, intensity difference and phase difference may be computed at least in part by the spatial location for the communication and/or physical characteristics of the user (e.g., based on physical shape of the user's ears and the presence of the user's head).

In some embodiments, the voice capable device, when rendering the first audio signal and the second audio signal, may compute an interaural time delay (ITD) for the first signal relative to the second signal based on the spatial location. For example, the voice capable device may determine how long it will take for a first sound to reach a first ear of the recipient and how long it will take for a second sound to reach a second ear of the recipient. The voice capable device may compute the ITD based on the difference between the time it will take for the sound to reach the first ear as compared to the second ear.

The voice capable device may compute an interaural intensity difference (IID) for the first signal relative to the second signal based on the spatial location. For example, the voice capable device may compute a first distance that a sound wave must travel from the spatial location to the first ear of the recipient and a second distance to a second ear of the recipient. Based on the difference in distances, the voice capable device may compute an expected difference in intensity (e.g., the IID) for the first signal relative to the second signal.

The voice capable device may retrieve a first transfer function and/or a second transfer function based on the spatial location and/or based on physical characteristics of the user. For example, the first transfer function may represent a function of how a sound changes as it passes through a left ear of the recipient and the second transfer function may represent a second function of how a sound changes as it passes through a right ear of the recipient.

In some embodiments, the voice capable device may shape the first signal based on the first transfer function and may shape the second signal based on the second transfer function. For example, the voice capable device may compute a modified first signal that is shaped based on the first transfer function and may compute a modified second signal that is shaped based on the second transfer function. For example, the voice capable device may modify the first audio signal (e.g., with the message "Bank account overdrawn") to approximate how the audio signal will change as it passes though the recipient's left ear and may modify the second audio signal to approximate how the audio signal will change as it passes through the recipient's right ear.

The voice capable device may render the first audio signal and the second audio signal based on at least in part on further modifying the first and second signals using the ITD and/or the IID. In other words, the respective modified first signal and/or second signal may be augmented by adding a time delay or an intensity difference based on how such differences in time and intensity would occur if the sound were originating from the spatial location.

The voice capable device may cause the output of the first audio signal on a first speaker and the second audio signal on a second speaker. For example, the first speaker may be a left headphone bud, and the second speaker may be a right headphone bud. The voice capable device may cause the output of the first signal on the left headphone bud and the output of the second signal on the right headphone bud. Because the first signal and the second signal are rendered to include the time delay, magnitude difference, and phase difference that would occur for a sound originating at the spatial location, the user will perceive the output to have originated at the spatial location.

In some embodiments, the voice capable device may output audio of a media asset simultaneously with a notification. In some instances, the media asset may comprise a spatial audio stream. For example, the user may be listening to a movie that comprises a spatial audio track when the kitchen timer ends. The spatial audio track may comprise a plurality of objects that are each located with a particular spatial location. For example, a voice from the movie may be associated with a spatial location in front of the recipient and an explosion sound effect may be associated with a spatial location behind the recipient. So that the notification is not perceived to originate from a same location as objects in the spatial audio track, the voice capable device may determine whether the selected spatial location of the message does not correspond to the spatial location of an object in the audio track prior to rendering the first audio signal and the second audio signal. For example, the voice capable device may determine that the selected location for the message (e.g., the message from the kitchen timer) does not correspond to the spatial location of the voice from the movie (e.g., a spatial location in front of the user). When the voice capable device determines that the spatial locations match, the voice capable device may modify the selected spatial location of the notification so that it differs from the spatial location of the object (e.g., the actor's voice) within the media asset. In such instances, the voice capable device ensures that the spatial locations do not match, because users may have a hard time distinguishing sounds when the sounds seem to originate from a same location.

In some embodiments, when the voice capable device determines that the spatial location of the message matches the location from the plurality of spatial locations in the audio track, the voice capable device may despatialize the audio from the media asset. For example, the voice capable device may convert the spatial audio stream to a stereo audio stream (e.g., or any other non-spatialized audio stream, such as a mono audio stream). By converting the audio stream to a non-spatial audio stream, the voice capable device may ensure that the recipient perceives the message as originating from the selected spatial location without interference from other sounds (such as the voice from the movie). For example, the voice capable device may select a new spatial location that is in the same direction as the previously selected spatial location, but that is closer to the recipient.

In some embodiments, the voice capable device may be in an environment that comprises multiple users. For example, the voice capable device may be a soundbar that has an array of speakers that can be configured to output spatialized sound. The voice capable device may identify an intended recipient of the message and may generate the notification near the intended user. For example, a first and a second user may both utilize the voice capable device to provide notifications while they are watching a movie. The first user may set a first kitchen timer (e.g., for the roast turkey) and the second user set a second kitchen timer (e.g., for mac and cheese). In such embodiments, the voice capable device may select a different spatial location for the notifications (e.g., for the first and second kitchen timers) based on an intended recipient of the notification. For example, the voice capable device may select a first spatial location that is near the first user when the first kitchen timer ends and may select a second spatial location that is near the second user when the second kitchen timer ends. That way, each of the first user and the second user may easily identify which timer has ended without the voice capable device having to explicitly identify the origin of the timer.

The voice capable device may identify the location of the user by, for example, performing a voice analysis on a voice query from the user. For example, when the voice capable device receives the query "Set a kitchen timer for five minutes," the voice capable device may utilize characteristics of the voice input to determine the identity of the user performing the voice input. Based on the identified user, the voice capable device may identify a location of the user (e.g., using a microphone array to identify a direction and estimated distance to the user and/or by identifying a wireless signal of a device corresponding to the user). The voice capable device may then provide a response to the voice query (e.g., a message) that is spatially positioned relative to the location of the user. For example, the voice capable device may select a spatial location in front of the user (e.g., the recipient) and may output the message "Five-minute timer has ended" at a location that is perceived, by the user, to be in front of the user. Accordingly, the user (e.g., the recipient) may more easily attend to the message by the voice capable device than if the sound was output by the voice capable device without the sound localization.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 3 depicts example rules associated with communications, in accordance with some embodiments of this disclosure;

FIG. 6 depicts an example database configuration for storing device information, in accordance with some embodiments of this disclosure;

FIG. 9 depicts an example database configuration in a multi-user environment, in accordance with some embodiments of this disclosure;

DETAILED DESCRIPTION

Figure 1:
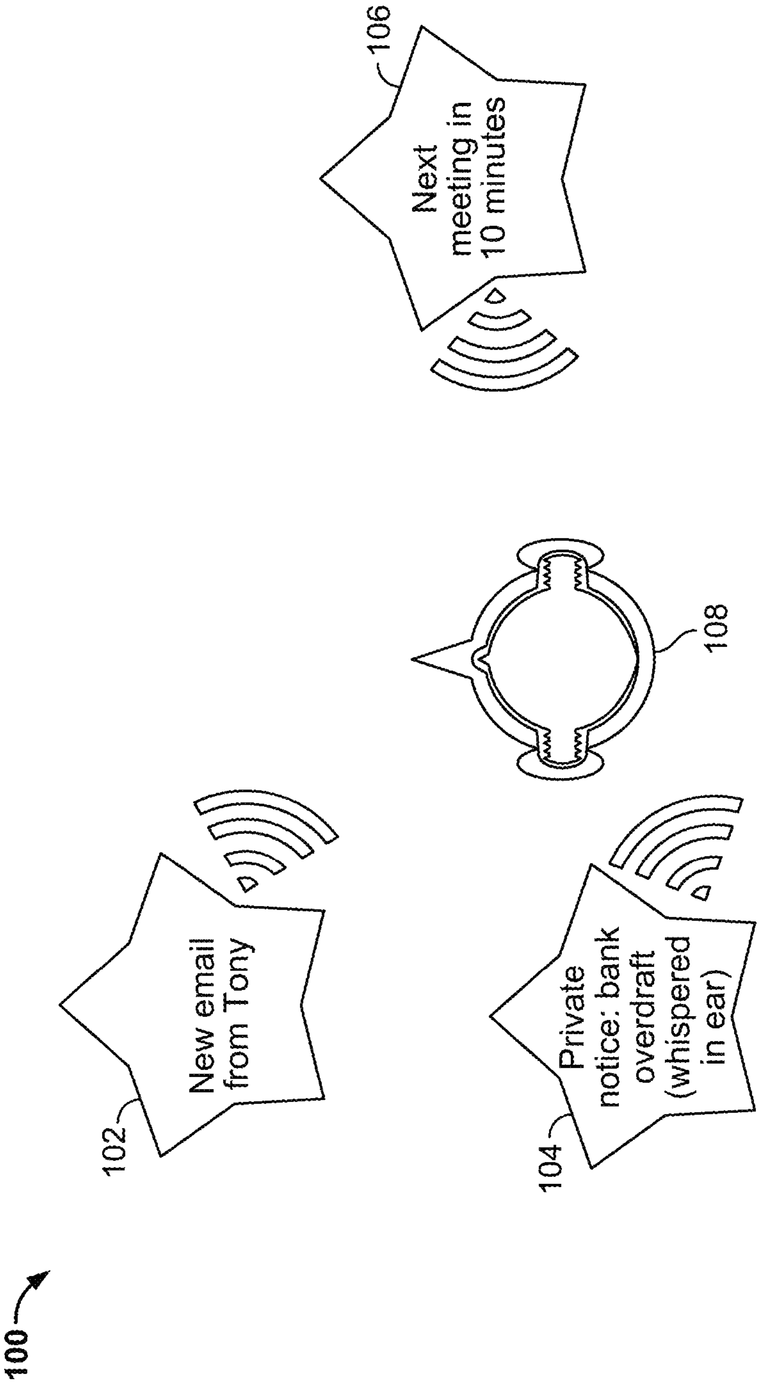
FIG. 1 depicts an example of providing spatialized audio communications to a user, in accordance with some embodiments of this disclosure.

Systems and methods are described herein for providing a voice capable device that provides contextual information for a communication via spatialized audio. As referred to herein, a voice capable device is any device capable of receiving, rendering, recording, processing, and/or outputting any type of audio signal and/or sound pressure wave. For example, a voice capable device may be a device having an array of microphones configured to detect sound input (e.g., via the array of microphones, e.g., with beamforming) and an array of speakers configured to provide audio output (e.g., via the array of speakers), such as a smart speaker. In some embodiments, the voice capable device may be implemented across one or more physical or virtual devices or components. For example, a voice capable device may include a first device having a microphone, a second device having a processor, and a third device having a speaker. The voice capable device may comprise software configured to coordinate actions and processing across each of the physical or virtual devices. Each of the devices may communicate with the other devices over one or more communication interfaces (e.g., Wi-Fi, Bluetooth, a serial or parallel bus, virtual machine bus, etc.). In some embodiments, the voice capable device may be implemented at least partially using a local general-purpose processor (e.g., for converting recorded sound waves to digital data) and/or a remote server (e.g., for converting the digital data to text or other transformed digital data). An example configuration for a voice capable device is described further below with respect to FIG. 11.

Due to the perceptual properties of spatial audio, humans can extract location information from sound without having to consciously attend to the process. For example, a human can determine that sound originates from behind them without having to consciously determine or think about an origin of the sound. Spatialized speech audio additionally allows humans to selectively attend to multiple audio streams by tuning in to select audio that originates at a unique location—an ability that is not possible when audio is presented via normal stereo or monophonic sources, without spatialization. For example, when a user is presented with audio that originates from multiple spatial locations, a user can selectively focus their auditory attention on a particular auditory stimulus from each of the multiple locations. For example, when one is both watching TV and talking to a guest, one can tune between listening to the voice of the guest and listening to the television. If the audio of the television and the audio of the guest were presented from a single spatial origin (e.g., via a mono or a stereo audio stream) one would not be capable of selectively tuning to either the television or the guest without consciously attempting to separate out both audio signals.

As described herein, a voice capable device (e.g., a smart speaker) may present contextual information to a user by rendering communications using spatial audio and choosing a spatial location for an origin for the communication. Thus, a user can receive the contextual information without the voice capable device having to explicitly provide of the contextual information. For example, the voice capable device may select a spatial location of a notification for a kitchen timer to seem to originate from a physical location of the kitchen timer in the recipient's home. Accordingly, the user can easily distinguish a notification for a timer in the kitchen from a timer in the laundry room based on the spatial location of the notification. For example, if the kitchen is located behind the recipient of the notification and the laundry room is located in front of of the recipient, the voice capable device selects a spatial location for the kitchen timer notification that, when output, is perceived by the recipient to originate from behind the recipient (e.g., the location of the kitchen). Accordingly, the recipient may differentiate the notification of the kitchen timer from that of the laundry room timer simply based on the spatial location and without the voice capable device announcing the location of the originating device. An example of a voice capable device providing spatial audio is discussed further with respect to FIG. 1.

In another example, the voice capable device may present contextual information to the user based on a characteristic of a notification and providing context for the notification by selecting a spatial location based on the characteristic. For example, the voice capable device (e.g., a user's phone) may receive a notification from a banking application indicating that the user has overdrawn their account. The voice capable device may determine (e.g., based on a set of rules or settings stored in a database) to output all banking notifications on the left side of a user. Additionally, the voice capable device may determine that the banking information is private, and may therefore simulate a whisper in the user's ear. For example, the voice capable device may select a spatial location for the notification that is close to the user's left ear and may select a low volume for the notification. The user can perceive context for the notification based on the location and output sound (e.g., because the user may know that banking notifications are always provided near the user's left ear and because the user may infer a privacy level from the sound volume). Because the user can perceive the context of such notifications without having to actively attend to the context, the use of spatialized sound streams can reduce cognitive burden on users, allowing for a more natural and fluid interaction style with voice capable devices.

In some embodiments, the voice capable device may provide notifications from devices that do not have voice capabilities and/or other communication capabilities (e.g., wireless communication capabilities such as Bluetooth). For example, a user may wish to receive watering reminders from a plant located in a household of the user. In such embodiments, the user may perform an enrollment procedure (discussed further below with respect to FIG. 5) to enroll a location of the plant (i.e., the device that is lacking both voice capabilities and other communication capabilities) so that the voice capable device may originate notifications and/or reminders from the enrolled location. For example, the voice capable device may originate a notification from the enrolled location of the plant every week that states "Water me!" When the user is in the presence of the plant, the voice notification generated by the voice capable device may appear to originate from the enrolled location. Accordingly, the voice capable device may provide a context (e.g., a context for the plant that needs water) for the notification (e.g., "Water me!") without having to state an origin of the notification (e.g., state the name or location of the plant).

In some examples, the voice capable device may originate subsequent communications from the enrolled location. For example, the user may respond to the prompt by saying "What did you say?" and the voice capable device may respond by saying "Me, over here, I need water!" By providing the subsequent communication from the enrolled location, the user can easily identify an originating object of the communication without the voice capable device needing to provide an explicit identification of the object (e.g., does not need to state that the plant requiring water is the monstera located in the living room).

In other embodiments, where multiple users are present in an environment, the voice capable device may select a spatial location for a communication based, at least in part, on an intended recipient for a communication. For example, a voice capable device may receive, from a first user, a first query for the weather in New York City and may receive, from a second user, a second query for the weather in Ithaca, New York. The voice capable device may identify the location for each of the users associated with the first and second queries, respectively, and may generate a first response spatially near the first user and a second response spatially near the second user. For example, the first user may perceive the origin of the first response to be close to first user, but may perceive the origin of the second response to be far away from the first user (e.g., because the perceived origin of the second response is close to the second user). In contrast, the second user may perceive the origin of the second response to be close to the second user, but may perceive the origin of the first response to be far away from the second user (e.g., because the perceived origin of the first response is close to the first user). Accordingly, as described in the examples above, a user may identify a source device and/or other context about a communication, such an intended recipient for the communication; a source application for the communication; a privacy level for the communication, etc., based on the selected spatial location of the communication. In some embodiments, the voice capable device may identify which user originated the query based on a voice signature of the user. For example, the voice capable device may determine that the first user corresponds to the first query and that the second user corresponds to the second query by generating a voice signature for each query and comparing the voice signatures to a database storing a relationship between voice signatures and users.

In some embodiments, when the user is listening to media (e.g., a movie) comprising spatial audio, the voice capable device may identify a spatial location for the notification that does not interfere with the spatial a location of the media asset. For example, if the media asset has a spatial audio object located at one meter from the front of a user's head, the voice capable device may select a spatial location for the message that is not one meter from the front of the user's head (e.g., a location one meter to the left of the user). Because a user can selectively tune in to notifications when they are spatially separate, but not when they are presented in a mono or stereo audio stream or presented at a same spatial location, the voice capable device can ensure that the user can tune in to notifications by presenting the notification at a spatial location that is different from spatial locations associated with the audio of the media asset.

FIG. 1 depicts an example of providing spatialized audio to a user (e.g., user 108). User 108 is depicted in example 100 receiving three different communications (e.g., communications 102, 104, and 106), each having different messages. Each of communications 102, 104 and 106 is depicted as having a unique message, where a spatial location for each messages correspond to a unique spatial location. For example, communication 102 is depicted originating from a location to the front left of the user (e.g., user 108); communication 104 is depicted originating from a location to the left of user 108; and communication 106 is depicted originating from a location to the right of user 108.

In some embodiments, the voice capable device generates spatial audio signals such that each message (e.g., messages 102, 104 and 106) seems to originate, as perceived by user 108, from different spatial locations (e.g., the spatial locations depicted in FIG. 1). For example, communication 102 comprises the message "New email from Tony" communication 104 is depicted as having the message "Private Notice: bank overdraft" and communication 106 is depicted as having the message "Next meeting in 10 minutes." The message "New Email from Tony" is perceived by the user to originate from an area to the front left of the user; the message "Private Notice: bank overdraft" is perceived by the user to originate from the left side of the user; and the message "Next meeting in 10 minutes" is perceived by the user to originate from the right side of the user. In some embodiments, each of the spatial locations for the messages is selected by the voice capable device based at least in part on location-based rules, such as those discussed below with respect to FIG. 3.

In some embodiments, the voice capable device may cause the output of communications 102, 104, and 106 to occur at different times. In some embodiments, the voice capable device may cause the output of communications 102, 104 and 106 to occur at overlapping times (e.g., simultaneously). In such embodiments, the user may selectively tune in to each of the communications by listening to the audio that originates from each unique spatial location.

In some embodiments, the voice capable device generates spatial audio based on a communication received by the voice capable device. As referred to herein, a communication may be any digital data received by a voice capable device. In some embodiments, the communication may be associated with at least one of a message and/or context relating to the communication. As referred to herein, the message may be any portion of the communication. In some embodiments, the message includes data that is explicitly output by the voice capable device (e.g., text of a notification, a voice output, an audio signal, metadata for a notification, etc.).

These examples of messages are meant to be illustrative and not limiting. Context relating to the communication may be any portion of the communication. In some embodiments, the context includes any portion of the communication that is not explicitly output by the voice capable device. For example, this may include data that is used by the voice capable device to select spatial locations for a message and/or select additional output characteristics for a message, such as an audio volume, cadence, etc.

For example, the voice capable device may receive a communication (e.g., any one of communications 102, 104 and 106), where the communication is associated with a message (e.g., "New email from Tony," "Private Notice: bank overdraft," "Next meeting in 10 minutes"). In some embodiments, the message may be a sound, a pointer or a URL to a sound file (e.g., an audio signal, a pointer or identifier of a sound file stored on the user's device, etc.) such as a beep, a ringtone, an alarm sound, etc. The voice capable device may receive the communication from an application installed on the phone and may determine the content of the communication based on the originating application. For example, the voice capable device may receive (e.g., via voice capable software running at least in part on the voice capable device) communication 102 from an email application, may receive communication 104 from a banking application, and may receive communication 106 from a calendar application. Each of the communications may include a message, such as the text depicted in example 100, or may include an indication of a sound (e.g., a ringing sound, a beep, etc.).

In some embodiments, the voice capable device receives the communications over a network connection. For example, the voice capable device may receive the communication from a server that provides and/or forwards notifications to the voice capable device. For example, the voice capable device may be associated with a profile for user 108, and the server may transmit notifications from, e.g., an email server associated with the profile of user 108, to the voice capable device. As an example, the voice capable device may receive, from the server, communication 102 comprising an indication of the message (e.g., "New email from Tony" and/or context of communication, such as an originating application).

In some embodiments, the server aggregates and transmits communications associated with a user profile. For example, a user may log in to multiple user accounts using the voice capable device and/or an application associated with the voice capable device. The voice capable device may transmit the login information to a server to store such information. The server may receive and/or identify communications associated with each of the multiple user accounts and may forward notifications associated with each of the accounts to the voice capable device. When the voice capable device receives a communication, the voice capable device may present spatial audio corresponding to the communication as described herein.

In some embodiments, the communication comprises metadata (e.g., context) related to the communication (e.g., an identity of an originating application). This metadata may be used by the voice capable device to determine a spatial location to output the message and/or other output parameters for the message (e.g., a volume). For example, the voice capable device may receive a communication associated with a message (e.g., "New email from Tony") and a communication characteristic (e.g., an identity of an Outlook application). As referred to herein, a communication characteristic may be any characteristic, data, metadata and/or identifier associated with a communication or a message.

As an example, a communication characteristic may be a type of the communication (e.g., a notification, a message, an alarm, etc.); an originating application of the communication (e.g., an email application, a messaging application, an IP address, etc.); a priority of the communication (e.g., high priority, normal priority, low priority, etc.); a time sensitivity of the communication (e.g., an urgent message that may interrupt other messages that are being rendered); a privacy level (e.g., a private message may be whispered and/or output only on a user's personal device); a source device of the communication (e.g., device to which the message or communication corresponds); and/or a timestamp associated with the communication. These examples of communications characteristics are meant to be illustrative and not limiting. An arbitrary number of communication characteristics may be associated with a communication without departing from the scope of the present disclosure. For example, in some embodiments, the voice capable device receives a communication comprising one or more messages and one or more metadata structures comprising one or more communication characteristics.

In some embodiments, the voice capable device described herein selects a spatial location for a communication based on the communication characteristics. For example, the voice capable device may determine, based on the communication characteristics, an originating application for the communication and, based on the originating application, may select a location for the communication. For example, when the communication is from a calendar application (e.g., such as communication 106) the voice capable device may select a spatial location for a message of the communication (e.g., "Next meeting in 10 minutes") that is on a right side of the user. The voice capable device may select the location based on, for example, a setting and/or rule to output all work calendar notifications on the user's right side. In another example, if the communication is from a user's personal calendar application, the voice capable device may output the message on a left side of the user. In some embodiments, the voice capable device may receive a data structure associated with the communication to identify the communication characteristic, such as the data structure described below with respect to FIG. 2.

Figure 2:
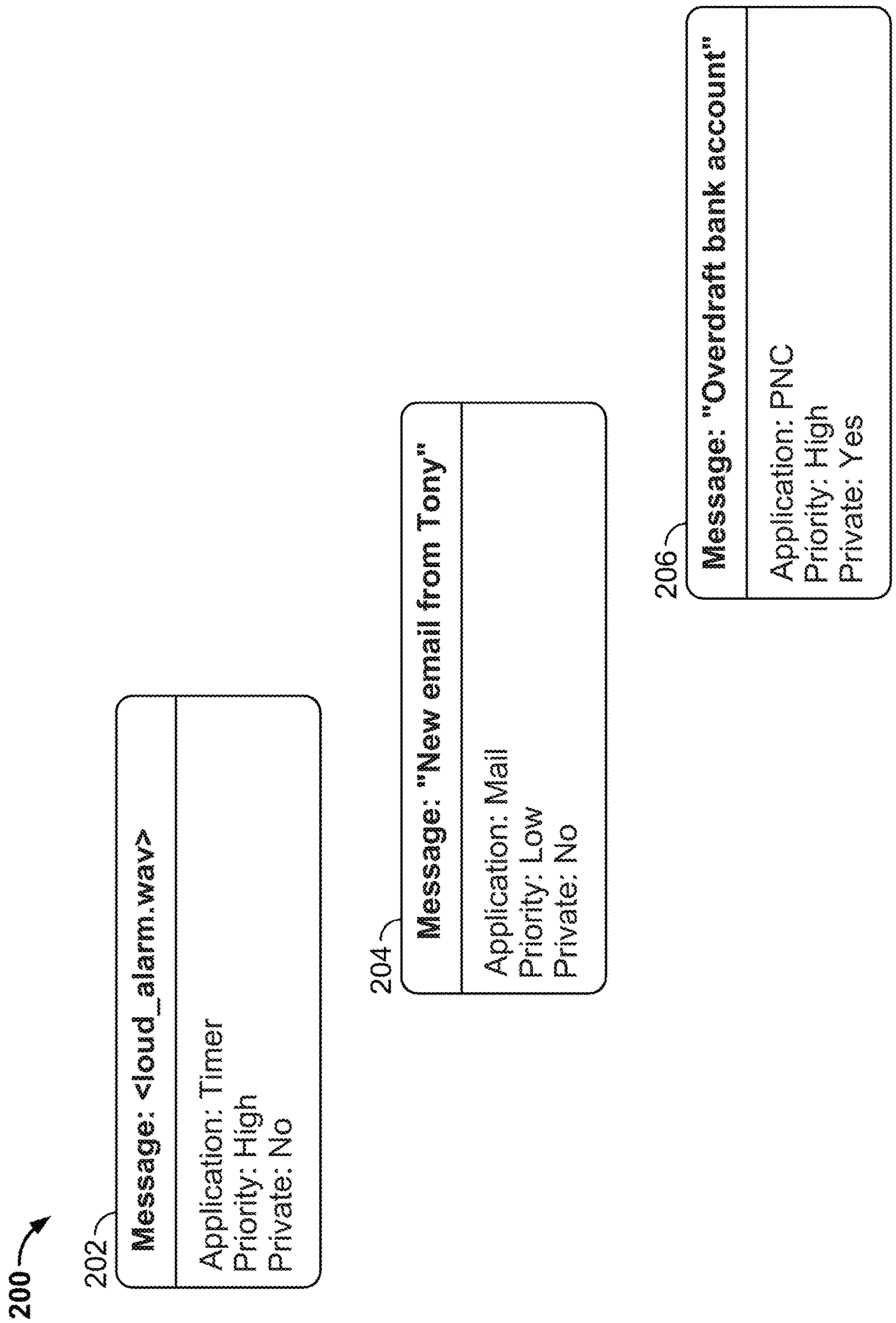
FIG. 2 depicts example characteristics associated with a communication, in accordance with some embodiments of this disclosure.

FIG. 2 depicts an example metadata structure associated with a communication, in accordance with some embodiments of the present disclosure. In some embodiments, the voice capable device may receive the data structure depicted in example 200, such as any of data structures 202, 204, and 206. The data structures depicted in example 200 comprise a message (e.g., text to be converted to a voice output and/or a pointer to a sound file) and one or more communication characteristics. For example, data structure 202 comprises a reference to the sound file loud_alarm.wav and includes the communication characteristics indicating an originating application for the communication ("Timer"), a priority for the communication ("High"), and an indication of whether the message is private ("No"). In such an example, the voice capable device may cause the output of the sound file loud_alarm.wav when outputting a communication and may select a spatial location for the alarm based on the application, priority, and/or privacy communication characteristics (e.g., by applying rules based on each of the application, priority, and/or privacy communication characteristics).

Data structure 204 is depicted comprising a message "New email from Tony" and includes the communication characteristics indicating an originating application for the communication ("Mail"), a priority for the communication ("Low"), and an indication of whether the message is private ("No"). Data structure 206 is depicted comprising message "Overdraft bank account" and includes the communication characteristics indicating an originating application for the communication ("PNC"), a priority for the communication ("High"), and an indication of whether the message is private ("Yes").

The data structures depicted in FIG. 2 are merely illustrative and are not limiting. Any number of messages and communication characteristics may be included without departing from the scope of the present disclosure. Although each of the messages in data structures 204 and 206 is depicted as text to avoid over complicating the drawing, the messages may comprise metadata relating to the message instead of a voice message itself. For example, the message may only indicate a sender of a new email ("tony123@gmail.com"). The voice capable device may generate a voice output "New email from Tony" based on comparing the received metadata ("tony123@gmail.com") to a database (e.g., a contacts application) and rendering a voice output (e.g., "New email from Tony") based on the comparison.

Referring again to FIG. 1, the placement of each of communications 102, 104, and 106 in example 100 represents a spatial location for the communication about user 108. For example, communication 102 is depicted having a spatial location forward and to the left of user 108; communication 104 is depicted having a spatial location to the left and slightly rearward of user 108; and communication 106 is depicted having a spatial location to the right of user 108. In some embodiments, the voice capable device renders a spatial audio signal so that each of communications 102, 104, and 106 is perceived, by user 108, to originate from the spatial locations depicted in example 100. The voice capable device may select the location for each of communication 102, 104 and 106 based on a respective data structure (e.g., one or more of data structures 202, 204, and 206) corresponding to each of the communications.

For example, communication 102 may correspond to data structure 204. Prior to causing the output of communication 102, the voice capable device may receive data structure 204 comprising the message "New email from Tony" and the communication characteristics for an originating application, a priority, and/or a privacy indication. The voice capable device may extract the message from data structure 204 and may determine that the message is text that is to be synthesized as a voice output. In response to extracting the message, the voice capable device may begin rendering an audio signal for the text (e.g., using a text-to-speech algorithm). Serially or in parallel, the voice capable device may extract the communication characteristics from data structure 204 and may identify which communication characteristics are present within the data structure (e.g., an originating application, a priority, and a privacy indication). Based on the communication characteristic(s), the voice capable device may select a spatial location for the message. For example, based on the extracted application, priority, and/or privacy setting (i.e., the communication characteristics), the voice capable device may select a specific spatial location relative to the user (e.g., user 108). As depicted in example 100, the voice capable device may choose a spatial location to output communication 102 that is forward, that is to the left, and that is far from user 108 at least because the communication is from an email application, has a low priority, and is not private.

In some embodiments, the voice capable device selects the spatial location based on the communication characteristic by applying code or a set of rules to the communication characteristics (e.g., the rules depicted and described below with respect to FIG. 3). By applying the set of rules to the communication characteristic, the voice capable device may be able to add context to a voice message output without explicitly providing such context. For example, the user may implicitly know that the email is from his or her work email instead of his or her personal email at least because of the spatial location that is selected by the voice capable device.

FIG. 3 depicts example rules/code associated with communications. Code 300 is depicted having two defined rules, rule 302 and rule 304. Rule 302 is depicted as applying to the application communication characteristic of a message. For example, when the communication is from a "Mail" application the spatial location for the message is selected such that the position is 90° with a distance is 5 meters. The output of the message may be rendered using "Female British" voice and may be output at a medium volume. When the application is the "Timer," other rules may apply to the message output settings.

In some embodiments, the rules may comprise compound or additional code or instructions. For example, when the voice capable device receives a communication from the email application, the voice capable device may further determine an account associated with the email application. For example, the user may have both a business account and a personal account associated with the mail application. The voice capable device may determine whether the email is from the business or the personal account and, based on the determination, may select a different spatial location for the message. For example, the voice capable device may choose a first spatial location on a left side of user 108 for mail received from a business account on a left side of user 108 and may choose a second spatial location, different from left side of user 108, for mail received from a personal account.

Although the distances depicted in FIG. 3 are shown as absolute distances, the distances in FIG. 3 may be approximations of distances. For example, the voice capable device may select a spatial location that corresponds to a spatial object that is closest to the location within code 300. For example, if a first spatial object is about 5.5 m from user 108 and a second spatial object is located 7 m from user 108, the voice capable device may select the first spatial object (e.g., located at 5.5 m) when outputting a message in accordance with rule 302.

Rule 304 corresponds to the privacy setting for a message. For example, if the communication characteristic for privacy is true, the spatial location is selected such that the position of the message is 180° with a distance of 0.1 meters, and is output at a whisper volume. In some embodiments, one or more rules may apply to a communication. For example, the application communication characteristic may be "Mail" and the privacy communication characteristic may be "True." In such embodiments, the systems described herein may apply one or more rules to the message (e.g., by blending or weighting the output settings in the rule—e.g., by computing an average distance or volume).

In some embodiments, rules may follow a hierarchy where different priorities are assigned to different rules. For example, rule 304 may supersede rule 302 because it may be more important to ensure that a private message is not heard by others than it is to ensure that the user knows an originating application for the message. For example, when the voice capable device determines that a communication is associated with a private communication characteristic and is from the mail application, the voice capable device may automatically apply rule 304, instead of rule 302, so that the message is rendered at a spatial location 0.1 meter from the user in a whisper volume (e.g., instead of outputting the message at a medium volume with a spatial location that is 5 meters from the user). In such examples, the voice capable device may maintain a hierarchy of rules (e.g., the privacy rules supersede rules associated with location alone).

Although FIG. 3 depicts example rules as computer code, other methods for storing and applying rules may be utilized without departing from the scope of the present disclosure. For example, the set of rules may be stored in a database and may be accessed using a primary key to reference all rules that apply to a particular communication. For example, the voice capable device may identify all communication characteristics in a message and may then retrieve all stored rules corresponding to each of the identified communication characteristics. In some embodiments, when a stored rule does not provide a setting for the message output (e.g., rule 304 does not provide a voice setting whereas rule 302 does), the voice capable device may automatically apply default settings (e.g., default settings associated with the voice capable device or default settings that were configured by user 108). In some embodiments, each of the location-based rules is configured manually by a user (e.g., user 108).

In some embodiments, the voice capable device determines that the context of the communication indicates a particular physical device (e.g., a stove of user 108). When the voice capable device receives a communication from a particular device, the voice capable device may generate output of the notification as to sound as if originating from such device, even when the device does not have voice capabilities itself. The voice capable device may select the spatial location for the message based at least in part on a location of a device corresponding to the communication. For example, when the voice capable device receives a communication from a user's stove (e.g., a timer ending notification for the stove), the voice capable device may select a spatial location for the message to correspond to that of the stove.

By setting the spatial location for the voice output of the message to correspond to the location of the stove, the voice capable device can provide additional context for the notification without having to explicitly identify the device. For example, if the user has a timer set for both a washing machine load in the user's laundry room and for a turkey cooking in the user's kitchen, the user will know that the kitchen timer has ended when the timer notification seems to originate out of the kitchen instead of the laundry room. In some embodiments, the voice capable device may determine the position of the originating device by either detecting the position of the device from a communication and/or signal from the device itself (e.g., a UWB signal), and/or by performing an enrollment process to enroll a location for devices that may not have communication capabilities (e.g., using a second device, discussed further with respect to FIG. 5).

In some embodiments, the voice capable device may detect (e.g., without user input) the position of a device that originates or transmits a communication based on a signal from the device and/or a stored location associated with a device. In some embodiments, the device is a physical object or device within a user's home, such as a stove, that may include network communication capabilities (e.g., a UWB radio), but may not comprise a voice output capability (e.g., may not include a voice assistant or a speaker). In other embodiments, the device may not comprise any of a network or voice output capability (e.g., a plant), but may have an enrolled location stored in a database.

Figure 4:
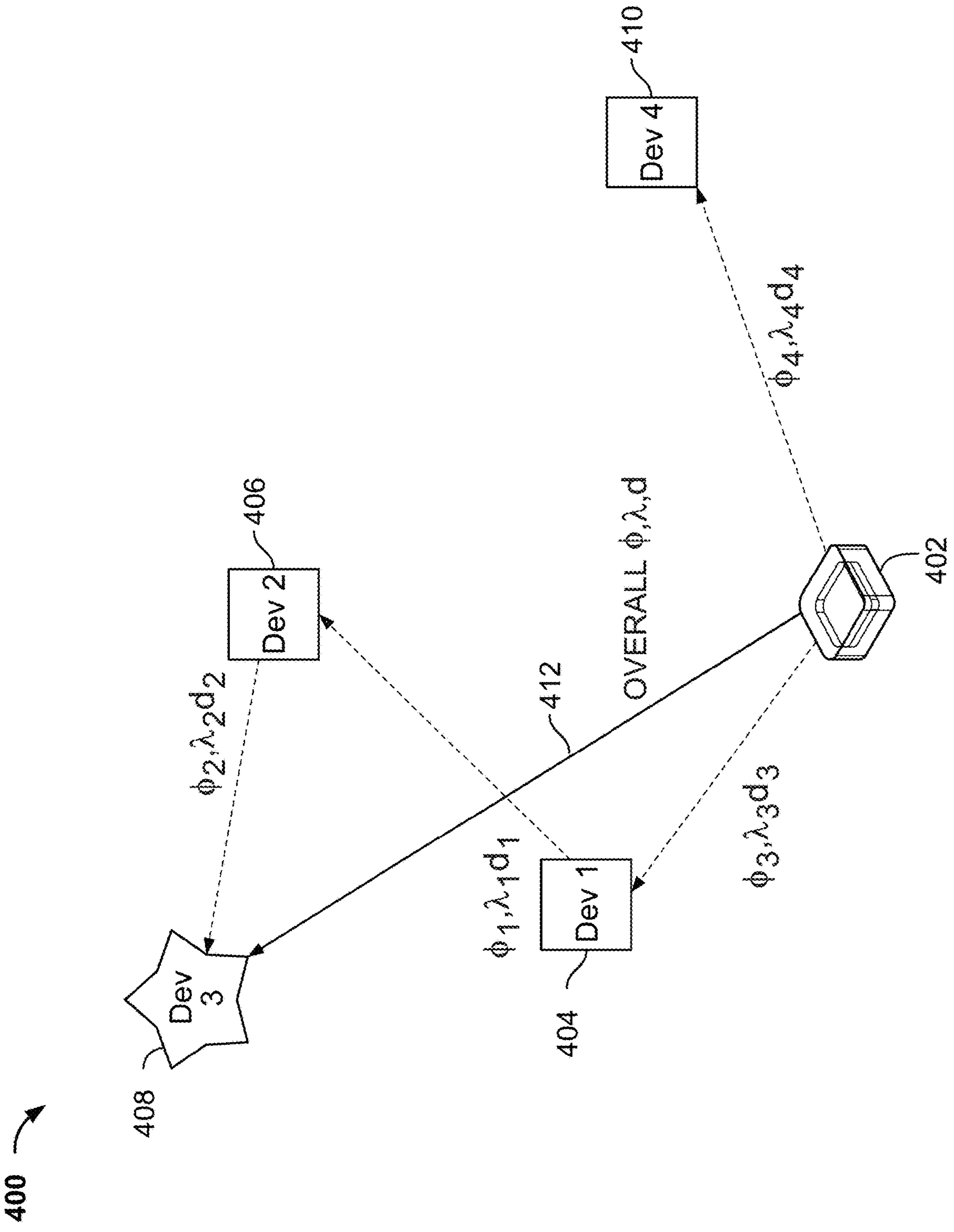
FIG. 4 shows an example configuration of multiple devices in an environment, in accordance with some embodiments of this disclosure.

FIG. 4 depicts an example configuration of multiple devices in an environment, in accordance with some embodiments of the present disclosure. FIG. 4 depicts environment 400 comprising devices 402, 404, 406, 408, and 410. In some embodiments, any of devices 402, 404, 406, 408, and 410 may be voice capable devices, as described herein. Devices 402, 404, 406, 408, and 410 in environment 400 may be any electronic or non-electronic device. For example, devices 402, 404, 406, 408, and 410 may be one or more of a tablet, a phone, a computer, a television, a router, a speaker and/or a non-electronic device such as a filing cabinet, a plant, a timer, etc.

In some instances, a network device (e.g., device 402) may utilize a wireless communication protocol to detect the location of one or more devices. For example, device 402 may utilize a two-way ranging to determine the relative position of another device (e.g., any of devices 404, 406, 408, and 410). The device (e.g., device 402) may utilize the timing of various signals sent between the devices to determine a position of the first device relative to a second device. For example, device 402 may transmit a signal (e.g., from a UWB radio of device 402) comprising a poll message.

Device 402 may record a time of sending the poll message (TSP). When the second device (e.g., device 404) detects the signal, the second device (e.g., device 404) may record a time of receiving the poll message (TRP) and may transmit a response (e.g., via a UWB radio of device 404) to device 402. The second device (e.g., device 404) may record a time of sending the response message (TSR). When the first device (e.g., device 402) receives the response message (e.g., at the UWB radio of device 402), the first device may record the time of receiving the response (TRR) and may transmit (e.g., via the UWB radio of device 402) a final message. In some embodiments, the final message transmitted by the first device may comprise a UWB identifier for the first device, the TSP, the TRR, and a time of sending the final message (TSF). The second device (e.g., device 404) may receive the final message from the first device and may store the data associated with the final message (e.g., in a database).

After receiving the final message, the second device (e.g., device 404) will have timing information (e.g., TSP, TRP, TSR, TRR, and TSF) for the various messages (e.g., the poll message, the response message, and the final message). Using the timing information, the second device may compute a time of flight for the signal between the first device (e.g., device 402) and the second device (e.g., device 404). Using the time of flight, the second device may approximate a position of the first device (e.g., device 402) relative to the second device (e.g., device 404), in particular a distance of the first device to the second device.

In some embodiments, device 404 may store the location information in a database, such as the database described further with respect to FIG. 6, that includes the relative position of device 404 to device 402. Although the above is described with respect to device 404 calculating the relative position between device 402 and device 404, the order and roles of both devices may be changed without departing from the scope of the present disclosure.

Additionally, the devices may perform the two-way ranging protocol with one or more devices to determine the position of multiple devices. For example, device 402 and device 410 may complete the two-way ranging protocol to determine the relative position between device 402 and device 410. When one of such devices is portable (e.g., a mobile phone), the devices may complete the two-way ranging protocol upon detecting movement of one or more of the devices. For example, device 410 may initiate a two-way ranging protocol with device 402 whenever device 410 detects movement of the device (e.g., based on an accelerometer or gyroscope sensor input of device 410). In another example, the two-way ranging protocol may be completed based on a polling interval (e.g., every ten minutes). Whenever the two-way ranging protocol occurs, the one or more devices may store and/or update the stored location in a database (e.g., the database described with respect to FIG. 6).

In some embodiments, the wireless radio (e.g., a UWB radio) of the device (e.g., device 402) comprises one or more wireless antennas. By detecting the signal from device 404 at each of the one or more wireless antennas, and computing a phase difference in the signal across the one or more wireless antennas, device 402 may compute an angle of arrival of the signal. Using the computed angle of arrival of the signal, device 402 may identify a direction of device 404 relative to the device 402. Device 402 may utilize the information about the time of flight of the signal and the angle of arrival of the signal to approximate a position of device 404 relative to device 402.

In some embodiments, subsequent to identifying the position of the network device, device 402 may determine additional information about the device (e.g., device 404), such as a name of the device, a network identifier (e.g., IP or MAC address), list of applications associated with the device, etc. Such information may be stored in a database, such as the database described with respect to FIG. 6. In some embodiments, the voice capable device (e.g., device 402) utilizes the information stored in the database to select an API or communication protocol for communicating with the other device (e.g., device 404).

Other methods for computing a position of devices may be used. For example, instead of or in addition to computing an angle of arrival for the signal, the device may work in conjunction with other UWB-capable devices. For example, device 402 may not receive UWB transmissions from device 408 because, for example, device 408 may be located too far away from device 402 to detect the signal. In such embodiments, device 404 may complete the two-way ranging protocol with device 406 and device 406 may complete the two-way ranging protocol with device 408.

Device 406 may transmit the relative distance and direction between device 408 and device 406 to device 404. Device 404 may relay the relative distance and direction between device 408 and device 406 to device 402 and may also send the relative distance and direction between device 406 and device 404 to device 402. Based on the two relative distances and positions, and the relative distance and position between device 404 and device 402, device 402 may compute an overall distance and direction 412 in FIG. 4. In such embodiments, any of devices 402, 404, 406, 408, and 410 may store the relative distances and directions and/or the overall distance and direction in a database (e.g., the database depicted in FIG. 6).

In some embodiments, a device (e.g., device 402) may utilize any other UWB ranging protocols to identify the location of a target device. While the example herein is described with respect to determining the position of devices based on a UWB signal, any type of signal or other method or steps may be used. For example, a Bluetooth or Wi-Fi signal may be used to approximate the location of a device, such as using round trip time or Wi-Fi triangulation.

In some embodiments, the voice capable device may detect the position of the one or more other devices using a camera (e.g., a stereoscopic camera). For example, the voice capable device may detect a position of a device (e.g., device 402) by determining a disparity between pixels captured from two or more lenses of camera that is accessible to device 402 (e.g., a camera of a drone that is communicatively coupled to device 402). In another example, device 402 may determine a position of another device using a LiDAR scanner. For example, device 402 may transmit a sequence of laser pulses and may measure a round trip time of the laser pulse. In some embodiments, device 402 may utilize one or more combinations of approaches to approximate a location of devices within environment 400, such as using a UWB radio of a drone and a camera of the drone.

In some embodiments, the voice capable device may utilize a portable device to identify and store the relative location of a physical object, such as a physical object that lacks at least one of a network communication capability and/or an audio communication capability. For example, the physical object may be any of devices 402, 404, 406, 408, and 410, which may be a binder, a backpack, filing cabinet, a Christmas tree, etc. In some embodiments, the voice capable device enables voice output for such physical devices by enrolling and storing the location of such devices and by outputting communications corresponding to such devices at a spatial location that corresponds to the stored location. For example, the voice capable device may receive a communication that corresponds to a user's filing cabinet (e.g., communication comprising a message to file taxes). The voice capable device may retrieve an enrolled location for the filing cabinet (e.g., from database 600 of FIG. 6) and may output the audio "File your taxes!" at a spatial location that corresponds to the physical location of the filing cabinet.

Figure 5:
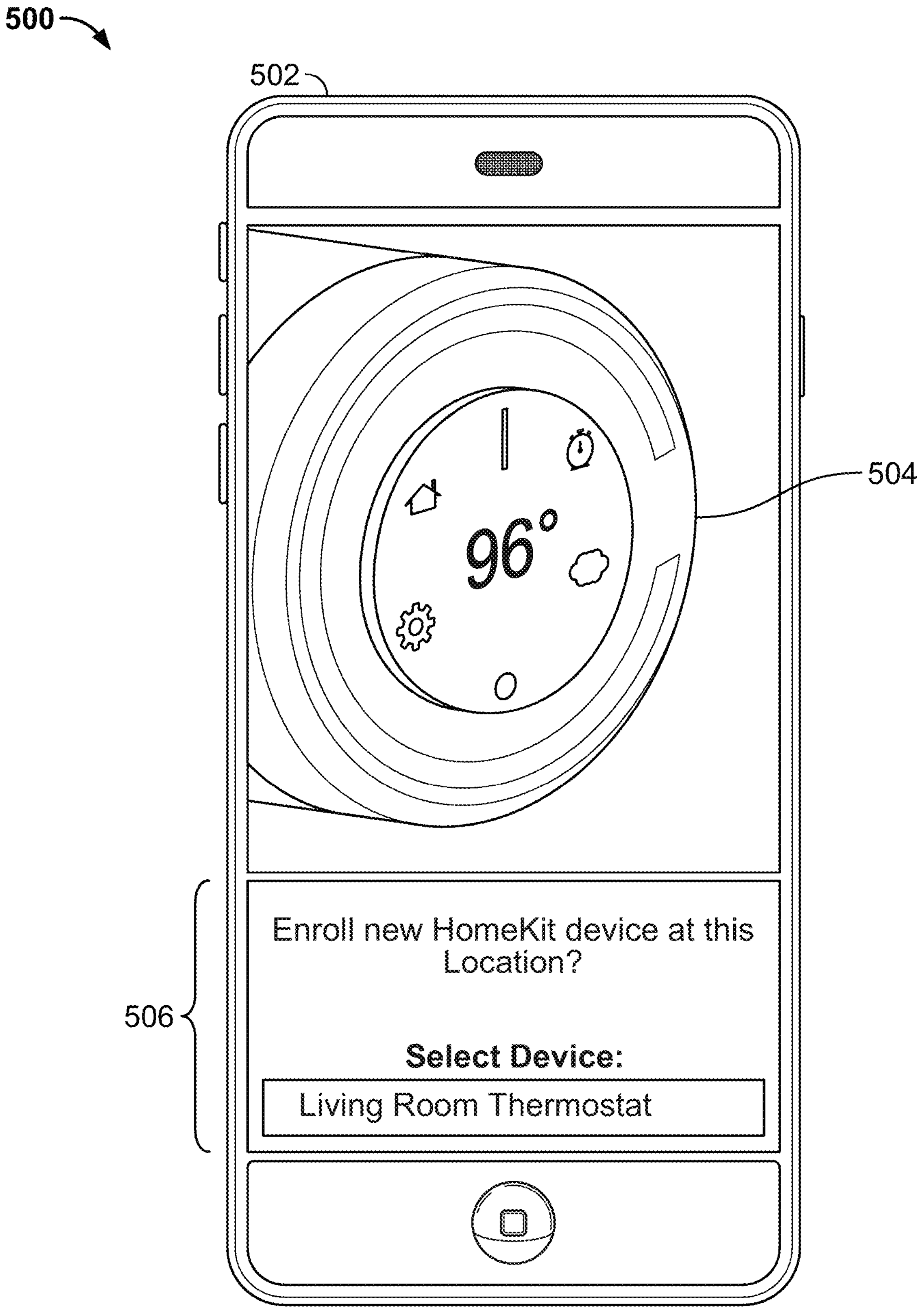
FIG. 5 depicts an example configuration for enrolling a device at a location, in accordance with some embodiments of this disclosure.

FIG. 5 depicts an example configuration for enrolling a device (e.g., a physical object) at a location, in accordance with some embodiments of this disclosure. FIG. 5 depicts environment 500 comprising device 502 and device 504. In some embodiments, any of devices 502 and 504 may correspond to devices 402, 404, 406, and 408 of FIG. 4. Devices 502 and 504 may be voice capable devices as described herein. As depicted in FIG. 5, an image of device 504 appears on a screen device 502. Such image may be captured by a camera of device 502. In such configurations as those depicted in FIG. 5, device 502 (e.g., a portable device, such as a mobile phone) may be used to approximate, enroll and/or store the location of device 504 (e.g., a device such as a thermostat that does not have a voice output capability). Device 502 is further depicted displaying information 506. In some embodiments, at least a part of information 506 corresponds to device 504 (e.g., a name of the device, a type of the device, a capability of the device, etc.).

In some embodiments, the voice capable device utilizes the position of device 502 to approximate the position of device 504. For example, device 502 may comprise a UWB radio that allows for precise positioning while device 504 does not (e.g., device 504 may comprise no wireless communication or location capabilities, or may comprise only a Wi-Fi and/or Bluetooth capability). For example, device 502 may be a phone comprising one or more wireless radios, a camera, and a display. The voice capable device may detect the position of device 502 using any of the protocols described above (e.g., the two-way ranging protocol) as the user moves device 502 about environment 500.

The voice capable device may store the position of device 502 as a proxy for the position of device 504 when device 502 is in a proximity of device 504 (e.g., the position of a mobile phone may be stored as the position of a thermostat in response to determining that the mobile phone is in a proximity of the thermostat). The voice capable device may determine that device 502 is in a proximity of device 504 when, for example, device 502 detects a wireless signal from device 504 (e.g., a Bluetooth signal, an NFC signal, a ZigBee signal, etc.) that is greater than a certain signal strength and/or when the round-trip time is less than a threshold amount of time, etc.

In some embodiments, device 502 may determine that device 502 is within a proximity of device 504 when the wireless signal strength from a wireless signal originating from device 502 is within a predetermined range. For example, the voice capable device may determine that device 502 is within a proximity of device 504 when a signal strength exceeds a certain value. In other embodiments, device 502 may determine that it is within a proximity of device 504 based on a user input—for example, a user input tagging a particular location of device 502 as the location of a physical object. In some embodiments, device 502 determines that it is in a proximity of device 504 based on detecting an image corresponding to device 504. For example, device 502 may detect a QR code corresponding to or displayed by device 504, and/or based on performing an image recognition algorithm to detect an object or device captured via a camera of device 502.

In some embodiments, in response to detecting that the portable device (e.g., device 502) is within a proximity of the physical object (e.g., device 504), the voice capable device (e.g., device 402) detects a relative physical location of the portable device to the voice capable device (e.g., device 402). For example, the voice capable device may detect the position of device 502 using any of the protocols described above (e.g., the two-way ranging protocol). In some embodiments, the voice capable device may store the relative physical position of device 502 to the voice capable device (e.g., device 402) in a database, such as the database described below with respect to FIG. 6.

In some embodiments, when the portable device (e.g., device 502) is within a proximity of the physical device/object (e.g., device 504), the voice capable device may request additional information about the physical device to store such information in a database. For example, the voice capable device may request a name, network address, device type, etc., associated with the physical device. In some embodiments, the information about the physical device is provided over a network connection (e.g., a Bluetooth connection between the physical device and the portable device).

In other embodiments, the information about the physical device/object may be provided without a wireless connection (e.g., by scanning a QR code affixed to or displayed on the physical object/device, by using a camera of the portable device to perform an image processing analysis of the physical object, etc.). In some instances, the voice capable device may prompt the user to manually input data about the physical device/object (e.g., via a user interface displayed on the portable device). Regardless of how the information about the physical device is received, any of the devices (e.g., the voice capable device, device 502 and/or device 504) may store the information in a database in connection with the registered location for the physical object.

In another example, the portable device may be a device that the user manually assigns to a physical object. For example, a user may attach a portable locator device to the user's dog collar. The portable locator device (e.g., a battery-powered tag comprising a UWB radio) may periodically transmit a signal that can be used to identify a location of the locator device, and thereby the physical object. As the location of the portable locator device changes, the voice capable device may update the location attributed to the physical object (e.g., the dog) based on the location of the portable device. For example, the voice capable device may continually update a database entry corresponding to the dog in response to receiving an updated location for the portable locator device.

FIG. 6 depicts an example database configuration for storing device information in accordance with some embodiments of the present disclosure. FIG. 6 is depicted having database 600 with first database entry 602, second database entry 604 and third database entry 606. Each of first database entry 602, second database entry 604 and third database entry 606 is depicted having an object name, a category, an address (e.g., an IP address) and a location. In some embodiments, the object name is determined, by the voice capable device, based on communicating with the object identified in the database entry. For example, the voice capable device may communicate with "Living Room Nest Thermostat" (e.g., device 504, depicted as first database entry 602) by generating an IP network packet and transmitting it to address 192.168.1.29.

In other embodiments, the information stored in database 600 may be at least partially manually entered by a user. For example, the filing cabinet represented by database entry 606 may not comprise any network capabilities (e.g., as indicated by the "dumb" category). For such devices, a user may manually enter at least some of the data depicted in database entry 606. In some embodiments, the location information stored in database 600 is relative to a position of the voice capable device. The location information may be static (e.g., only updated upon a request from the user), may be updated periodically (e.g., by polling devices on a periodic basis, such as every five minutes, every week, etc.), or may be updated based on detecting an input (e.g., in response to detecting movement of any one of the devices identified in database 600 and/or the voice capable device.

In some embodiments, the location stored in database 600 is a proxy location for the device identified in a corresponding database entry. Database 600 may store an association between an identifier for a physical device (e.g., the name or address for a device) and a relative physical location of a portable device to the voice capable device. For example, as discussed with respect to FIG. 5, the voice capable device may determine the position for a device, such as a thermostat, using a portable device, such as a user's mobile phone. In some embodiments, the voice capable device accesses the information, such as location information, stored in database 600, to identify a relative physical position of a physical object to the voice capable device. Although the location depicted in database 600 is depicted in meters, data that approximates a location may be stored, such as a signal vector (e.g., a signal strength and direction). Database 600 is merely illustrative and not to be considered limiting. While the database 600 is depicted with respect to a single user or a single household, any number of users, and fields may be represented by database 600, such as the database fields depicted in the databases 902 and 904 of FIG. 9.

In some embodiments, the voice capable device may be in an environment that comprises multiple users. In such environments, the voice capable device may be a voice capable device that can output sounds simultaneously to multiple users. For example, the voice capable device may be a soundbar in a room where each of the multiple users is located. In another example, the voice capable device may be an aggregation of sound devices that are worn by the individual users (e.g., headphones worn by a first user and a hearing aid worn by a second user). In the example when the voice capable device is a device that simultaneously outputs audio to multiple users (e.g., a soundbar), the device may comprise one or more speakers configured to provide spatial sound. For example, a soundbar may comprise one or more speakers oriented in a forward direction, one or more speakers oriented in an upward direction, one or more speakers oriented in a backward direction, etc.

The voice capable device may generate, prior to rendering spatial audio, an acoustic fingerprint of an environment in which the voice capable device is located (e.g., by outputting a plurality of tones from a speaker and measuring echoes from the plurality of tones to generate an acoustic fingerprint). The voice capable device may utilize the acoustic fingerprint to calculate how sounds are reflected and/or absorbed by objects within the environment and may use the calculation to render spatial audio.

In some embodiments, where multiple users are present in an environment, the voice capable device may identify an intended recipient of the message and may generate the notification near the intended recipient (e.g., may render the audio as to seem to originate close to a physical location of the intended recipient).

Figure 7:
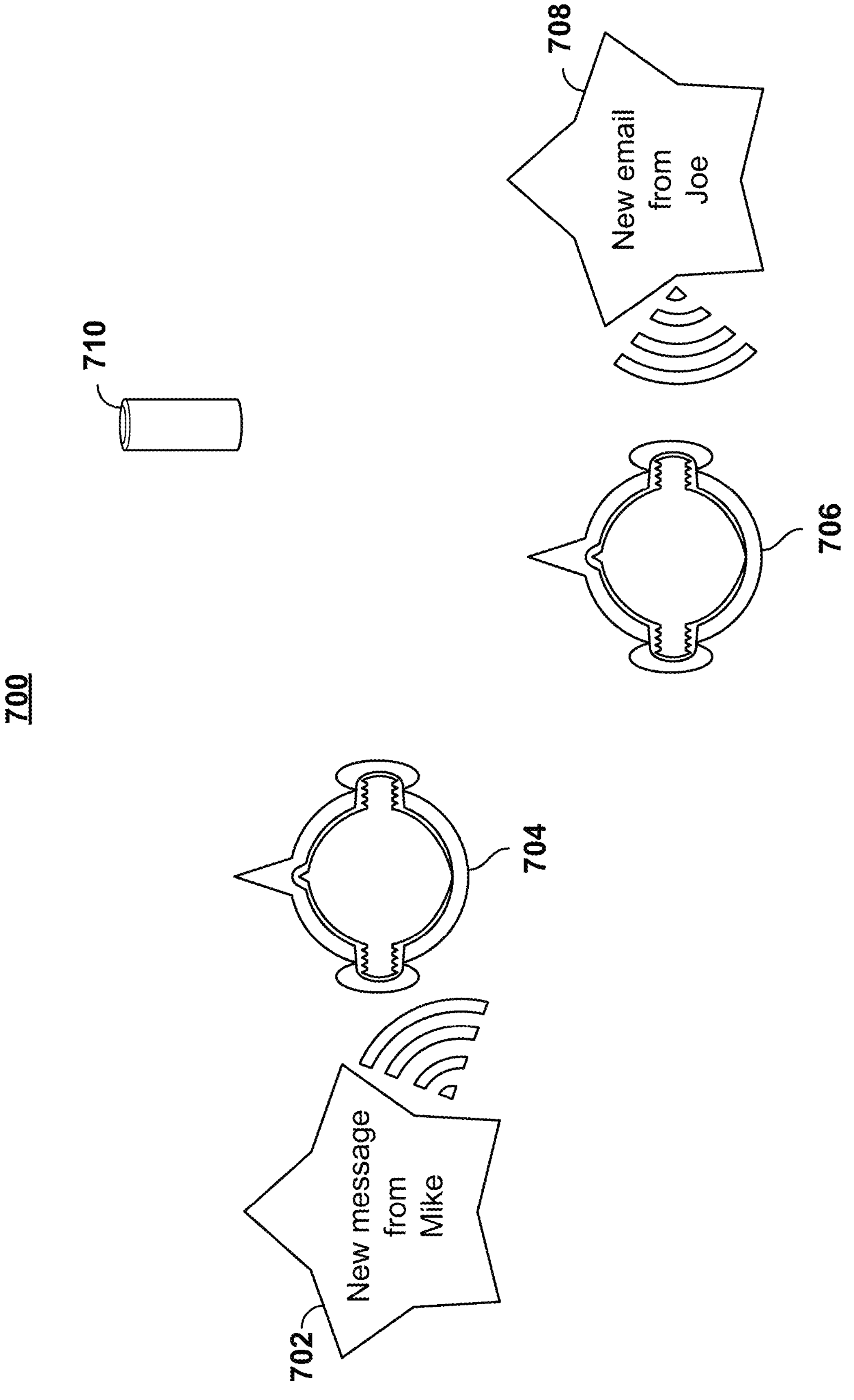
FIG. 7 depicts an example configuration for providing spatial audio to multiple users, in accordance with some embodiments of this disclosure.

FIG. 7 depicts an example configuration for providing spatial audio to multiple users, in accordance with some embodiments of the present disclosure. Environment 700 is depicted having user 704 and user 706. Device 710 (e.g., a voice capable device) may output communications intended for user 704 (e.g., notification 702) near user 704 and may output communications intended for user 706 (e.g., notification 708) near user 706. In some embodiments, user 704 and/or user 706 may be user 108 depicted in FIG. 1. In some embodiments, device 710 may be the voice capable device or may be any of the other devices discussed herein, such as any of devices 402, 404, 406, 408, 410, 502 and/or 504.

For example, first user (e.g., user 704) and a second user (e.g., user 706) may both utilize the voice capable device to provide notifications while they are watching a movie. The voice capable device may receive a first communication (e.g., a first communication comprising a message "New message from Mike" and a context identifying user 704 as the recipient) and a second communication (e.g., a second communication comprising a message "New email from Joe" and a context identifying user 706 as the recipient).

The voice capable device may determine that the first communication corresponds to the first user (e.g., user 704) based on the first context and that the second communication corresponds to the second user (e.g., user 706) based on the context. In response to determining that the first communication corresponds to the first user and that the second communication corresponds to the second user, the voice capable device may identify a first location of the first user and a second location of the second user (e.g., the physical locations depicted in environment 700 of user 704 and user 706, respectively).

The voice capable device may identify a respective first and second spatial location corresponding to each of the first location and the second location and may render a first audio signal based on the first spatial location and may render a second audio signal based on the second location. For example, the voice capable device may generate a first audio signal for one or more of the speakers in the speaker array that will cause the first audio signal to be perceived, by user 704, to originate from a location that is near user 704 (e.g., a spatial location that is closest to a physical location of user 704). The voice capable device may generate a second audio signal for one or more of the speakers in the speaker array that will cause the second audio signal to be perceived, by user 706, to originate from a location that is near user 706 (e.g., a spatial location that is closest to a physical location of user 706). In some embodiments, the voice capable device modifies at least one of the first audio signal and the second audio signal based on a configuration of the array of speakers and/or an acoustic fingerprint of the environment in which the voice capable device is located (e.g., environment 700 comprising device 710).

In some embodiments, the voice capable device outputs the first audio signal and the second audio signal near the first user and the second user, respectively, by identifying a device associated with each user, and causing the device to output audio to the user. For example, the first user (e.g., user 704) may be wearing a first set of headphones and the second user (e.g., user 706) may be wearing a second set of headphones. The voice capable device may detect that the first set of headphones corresponds to the first user and the second set of headphones corresponds to the second user (e.g., based on detecting a user account associated with each device and confirming that the devices are being worn). In response to the detecting, the voice capable device may cause the first audio signal to be output by the first audio device and the second audio signal to be output by the second audio device.

In some embodiments, such as where the audio is output by a common audio device, such as a soundbar, the voice capable device may identify and/or track the location of a user in an environment (e.g., environment 700 or environment 800 depicted in FIG. 8) based on a device associated with the user.

Figure 8:
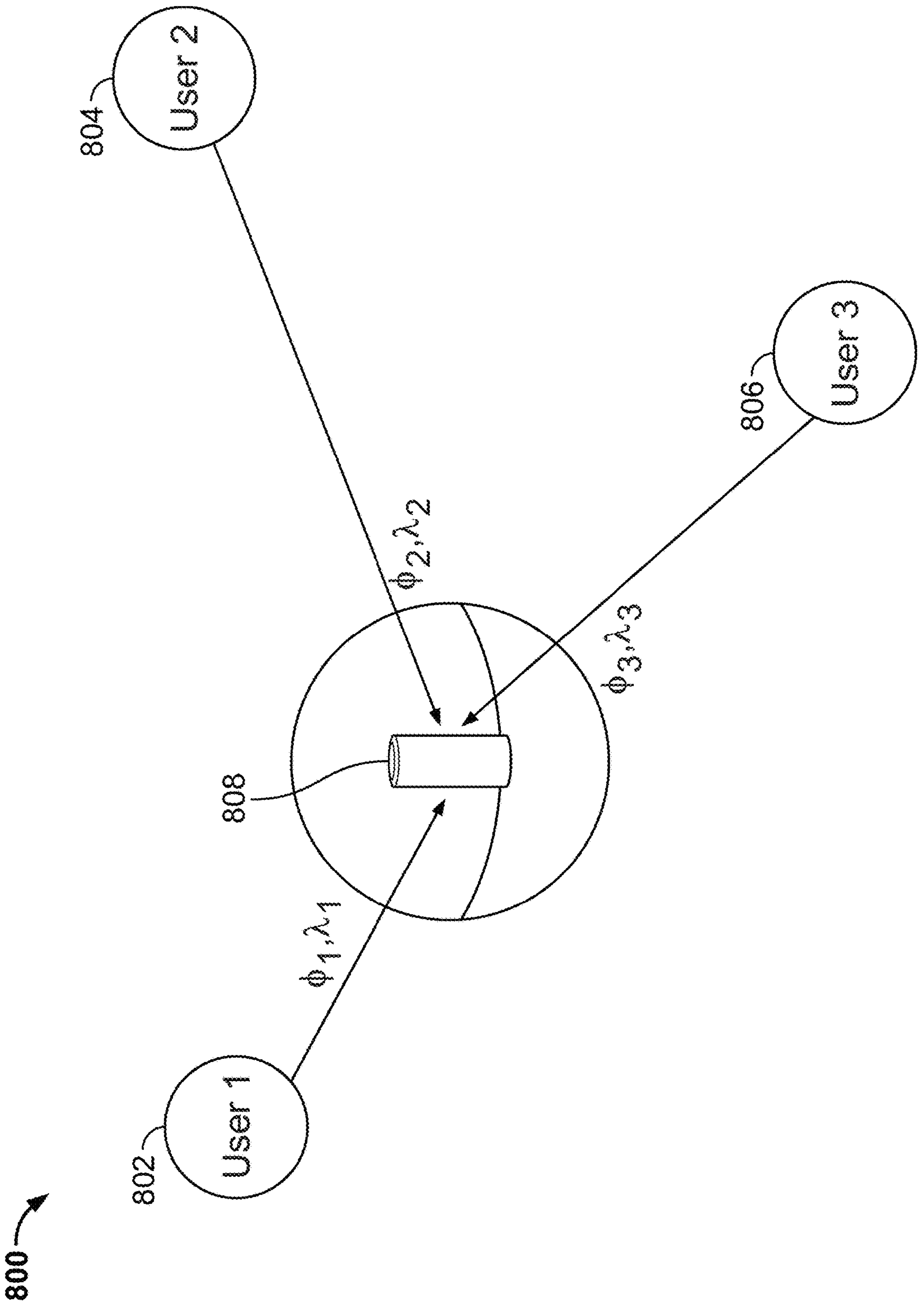
FIG. 8 depicts an example configuration of a spatial audio device in a multi-user environment, in accordance with some embodiments of this disclosure.

An example confirmation of a spatial audio device in a multi-user environment is depicted FIG. 8. Environment 800 is depicted having users 802, 804 and 806, which are each located at different physical locations from device 808 (e.g., a voice capable device). In some embodiments, the voice capable device determines an approximate position for each of users 802, 804 and 806 based on the relative positions of unique devices that each correspond to one of users 802, 804, and 806 (e.g., based on user accounts corresponding to each of users 802, 804, and 806). For example, the voice capable device may determine that a first mobile phone corresponds to user 802 and may detect the relative position of the mobile phone to the voice capable device (e.g., device 808). For example, the voice capable device may determine the position of the mobile phone based on a wireless signal (e.g., UWB signal) between the mobile phone and device 808. The voice capable device may repeat this process across one or more portable devices associated with the one or more users. In some embodiments, the voice capable device may store the relative position of the mobile device in an association with the respective user (e.g., user 802) in a database, such as the database depicted and described further with respect to FIG. 9.

The voice capable device may identify a location of a recipient for a notification based on detecting a wireless signal from a device that belongs to the user (e.g., the user's cell phone or smartwatch). For example, the voice capable device may detect three potential recipients (e.g., users 802, 804 and 806) in an environment (e.g., based on detecting cell phones corresponding to each of the recipients within environment 800). The voice capable device may identify a cell phone that is associated with the intended recipient of the message (e.g., based on a user profile) and may identify a location of the cell phone based on a wireless signal from the cell phone (e.g., based on an ultra-wide band (UWB) signal, a Bluetooth signal, a Wi-Fi signal, etc.) that is detected by the voice capable device or by one or more other devices. Based on the detected location of the cell phone, the voice capable device may select a spatial location to output the notification. For example, the voice capable device may select the location of the cell phone to output the notification at least because the voice capable device may predict that the user is located close to the user's cell phone.

FIG. 9 depicts example database configurations in a multi-user environment, in accordance with some embodiments of the present disclosure. For example, FIG. 9 depicts database 902 comprising a command utterance, a user identity and a relative direction from the voice capable device to the user. For example, the voice capable device, in response to detecting a first relative position for a first user (e.g., user 802, named Steve) and a second relative position for a second user (e.g., user 804, named Helen), the voice capable device may store the relative positions in database 902. Database 904 is depicted having feedback (e.g., a response to a voice query, such as "Timer is set") and relative position (e.g., a relative spatial location to output the feedback).

In some embodiments, the voice capable device may determine the relative position of a first user and a second user based on a voice query from each of the first user and the second user. For example, the voice capable device may detect, at a microphone array (e.g., of device 808), a voice input corresponding to the first user (e.g., identified based on determining that a voice signature for the voice input matches, by at least a threshold amount, a voice signature associated with the user).

The voice capable device may determine, based on a difference of signals recorded by microphones of the microphone array, a relative direction of the voice input (e.g., based on a difference in time required for the input to reach various microphones in the array). For example, a beamforming algorithm may be used to focus on and detect the relative direction of the user. In some embodiments, the voice capable device estimates a relative distance of the first user based on the detected voice input (e.g., based on a volume of the voice input). The voice capable device may compute a first spatial location based on a relative direction and the estimated relative distance. For example, the voice capable device may compute a spatial location to output a notification for the first user based, at least in part, on the relative direction and the estimated relative distance that is computed based on the received user voice input. For example, an example output location for a notification (e.g., "Timer is set") is depicted in database 904, where a relative position for the output of the notification is indicated in the "Relative Position" column. In some embodiments, the relative position is an estimated relative position between the voice capable device and the user to which the feedback pertains (e.g., user 802 that requested the setting of the timer).

In some embodiments, the voice capable device may update a position of the user (e.g., user 802) in response to detecting a second voice, where the second voice input is detected after the first voice input, which corresponds to the first user (e.g., user 802). For example, after detecting the first voice input (e.g., "Set a timer") from the first user (e.g., user 802), the voice capable device may detect a second voice input from the same user (e.g., based on comparing the voice input to the signature for the user). Based on detecting the second voice input, the voice capable device may update the stored position for user 802 in database 902.

The updated relative direction to the user may be computed, by the voice capable device, based on the voice input (e.g., using the array of microphones, as described above), or based on a portable device associated with the user (e.g., by detecting a location of a phone corresponding to the user). Because the voice capable device may provide a response to the voice query (e.g., a message) that is spatially positioned relative to the location of the user (e.g., user 802), the user may more easily attend to the message by the voice capable device than if the sound was output by the voice capable device without the sound localization (e.g., stereo audio stream comprising messages for both the first user and the second user). Accordingly, a user can selectively tune in to the message that corresponds to the user.

In some embodiments, a communication for a user is presented while other audio is being output by the voice capable device, such as a media asset (e.g., a movie). As discussed above, a user can selectively tune in to audio when the audio is presented as a spatial audio stream, with the audio being presented at unique spatial locations. Accordingly, in some embodiments, the voice capable device may determine whether a media asset is being output by an audio device and, if the voice capable device receives a communication while the media asset is being output, the voice capable device may select a spatial location for the message such that it does not interfere with the audio of the media asset (e.g., so that a message of the communication is presented at a unique spatial location from any spatial locations corresponding to the media asset). For example, the voice capable device may determine whether the media asset comprises spatial audio, and if so, determine spatial locations for audio of the media asset (e.g., based on context of the communication, such as a number of audio channels in the media asset, or based on metadata or information about the media asset).

For example, the user may be listening to a movie that comprises a spatial audio track when a kitchen timer ends. The spatial audio track may comprise a plurality of objects that are each located with a particular spatial location. For example, a voice from the movie may be associated with a spatial location in front of the recipient and an explosion sound effect may be associated with a spatial location behind the recipient. So that the notification does not appear to originate from a same location as objects in the spatial audio track, the voice capable device may determine whether the selected spatial location of the message does not correspond to the spatial location of an object in the audio track prior to rendering an audio output (e.g., a first audio signal and a second audio signal).

For example, the voice capable device may determine that the selected location for the message (e.g., the message from the kitchen timer) does not correspond to the spatial location of the voice from the movie (e.g., a spatial location in front of the user) and may output the audio at the selected spatial location. When the voice capable device determines that the spatial locations for the message and the voice in the media asset match, the voice capable device may modify the selected spatial location of the notification so that it differs from the spatial location of the object (e.g., an actor's voice) within the media asset. In such instances, the voice capable device performs the check because users have a hard time distinguishing sounds when the sounds seem to originate from a same location.

In some embodiments, when the voice capable device determines that the spatial location of the message matches the location from the plurality of spatial locations in the audio track, the voice capable device may despatialize the audio from the media asset. For example, the voice capable device may convert the spatial audio stream to a stereo audio stream (e.g., or any other non-spatialized audio stream, such as a mono audio stream). By converting the audio stream to a non-spatial audio stream, the voice capable device may ensure that the recipient perceives the message as originating from the selected spatial location without interference from other sounds (such as the voice from the movie). For example, the voice capable device may select a new spatial location that is in the same direction as the previously selected spatial location, but that is closer to the recipient.

Because the voice capable device outputs the message of the communication at a unique spatial location, the user can clearly listen to the message without having to pause or interrupt the audio of the media asset. In some embodiments, when the voice capable device determines that the media asset does not comprise spatial audio, the voice capable device may select a pseudo random spatial location to output the message, may output the message in proximity to a recipient of the message, and/or may output the message at a location chosen based on a communication characteristic as described earlier above.

In some embodiments, when the media asset comprises spatial audio, the voice capable device may compare a length of time required to output the message to a similarly sized portion of the media asset to ensure that a spatial location chosen to output the message does not correspond to a spatial location of audio for the media asset. For example, the voice capable device may buffer a portion of the media asset and may determine where each of the spatial audio objects will be rendered during the portion.

When the voice capable device determines that there is a conflict between a selected location for outputting the message and the spatial locations for the spatial audio objects of the media asset, the voice capable device may modify the location to output the message so that the conflict no longer exists (e.g., so that the spatial location does not match the location of a sound object in the media asset by at least a threshold amount).

In some embodiments, the voice capable device may delay the output of a message so that the spatial location corresponding to a message does not correspond to any location for spatial audio objects within the media asset. As an example, the voice capable device may buffer and inspect portions of the media asset until the voice capable device identifies a portion of the media asset where there are no conflicts between a selected spatial location for the message and a location of a spatial audio object corresponding to the media asset.

In some embodiments, the voice capable device communicates with a server (such as a content server or a content delivery network "CDN") to retrieve and/or identify the portion of the media asset. For example, the voice capable device may provide a length of time to output audio of the notification (e.g., in seconds) via an application programming language ("APL") to the server. The server may respond to the voice capable device with an identification of a portion of the media asset where the location of none of the spatial audio objects conflicts or corresponds to a selected spatial location for the notification. In response to receiving the reply from the server, the voice capable device may select a start of the identified portion to begin outputting the notification.

In some embodiments, the voice capable device may despatialize a spatial audio signal so that audio of the media asset is a presented as stereo audio, while the voice capable device causes the output of the notification as spatial audio. When the voice capable device finishes outputting the audio, the voice capable device may resume the output of the media asset using spatial audio. Because the user can selectively tune in to audio that originates from a unique location, the user can selectively listen to the audio of the notification, without the voice capable device interrupting the presentation of the media asset. To get a user's attention, the voice capable device may identify a name of a recipient of a message and, prior to causing the output of the message, may cause to be output an audio identifier for the user at the spatial location (e.g., the location where the message will later be output). By getting the user's attention by stating his or her name, the user will be tuned in to the location from which the message will originate.

Figure 10:
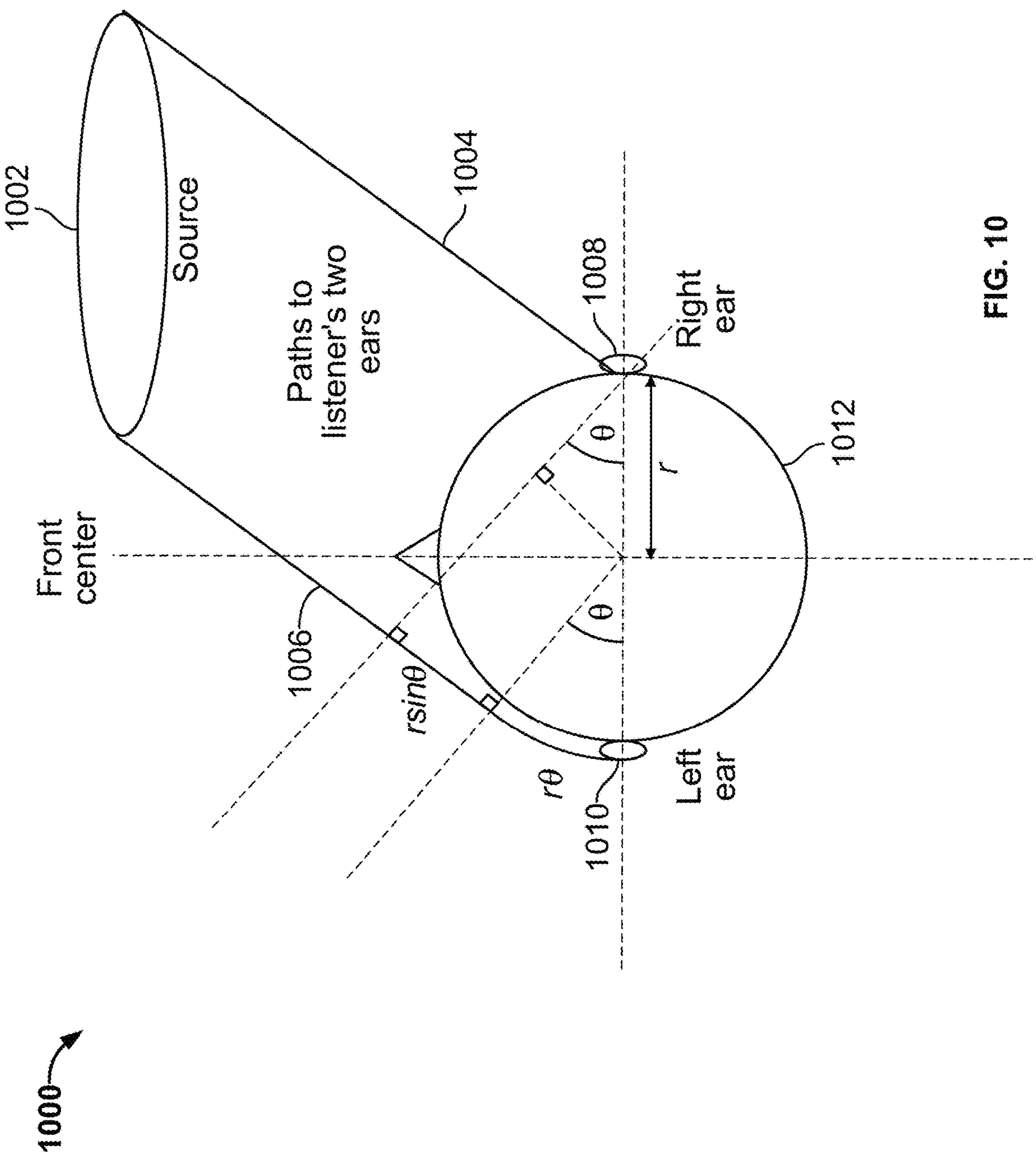
FIG. 10 depicts an example of providing a spatial audio signal to a user, in accordance with some embodiments of this disclosure.

FIG. 10 depicts an example of providing a spatial audio signal to a user, in accordance with some embodiments of the present disclosure. FIG. 10 is depicted with environment 1000 comprising user 1012, which may correspond to any of users 108, 704, 706, 802, 804, 806. User 1012 is depicted having two ears, left ear 1010 and right ear 1008, which, by receiving audio at different times and phases, etc., enable a user to perceive sound as originating from different particular locations. For example, source 1002 (e.g., the voice capable device or any of the devices described herein) may output audio to user 1012. Path 1006 represents the path required for a sound wave to travel from source 1002 to left ear 1010 and path 1004 represents the path required for the sound wave to travel from source 1002 to right ear 1008.

A user's ability to localize sound depends at least in part on three cues, an interaural time delay ("ITD"), an interaural intensity difference ("IID"), and a head-related transfer function ("HRTF"). As referred to herein, the ITD may be a difference in arrival time of the sound between the two ears (e.g., left ear 1010 and right ear 1008). As referred to herein, IID may be a difference in amplitude of the sound as it arrives at the two ears (e.g., left ear 1010 and right ear 1008), as a result of the difference in distance (as sound intensity decreases with the square of distance). In some instances, both the ITD and IID may be minor cues to the user as compared to the HRTF. As referred to herein, the HRTF may be a function that determines how the frequencies constituting a sound at a given position are characteristically modified, due to the shape of the pinnae (e.g., external ears) and the presence of the head itself, as the sound enters the ear canal and provides the encoded location of the sound source (e.g., source 1002).

In some embodiments, audio from source 1002 will arrive at left ear 1010 and at right ear 1008 at two different times. As depicted in environment 1000, the amplitude of the signal followed by path 1006 to left ear 1010 will be less than the amplitude of the signal followed by path 1004 to right ear 1008, because the signal travels farther from the source to the respective ear on path 1006 as compared to path 1004. Additionally, the sound reaching the left ear 1010 and right ear 1008 will be differentially affected by passing through the head of user 1012 and pinnae, resulting in different convolutions of the audio signal as it is received by left ear 1010 and right ear 1008. The different convolutions of the audio signals corresponds to the HRTF.

In some embodiments, the voice capable device virtually spatializes sounds (e.g., makes sounds seems to originate from a given position anywhere in three-dimensional space) by artificially manipulating the ITD and IID between the left ear 1010 and right ear 1008, and performing a convolution of a sound signal (e.g., a sound signal for a message of a communication) to introduce an approximation of the head-related transfer function. Accordingly, an arbitrary audio signal may be processed in such a way by the voice capable device that it matches what the listener would have heard if it had been played at a given source location (e.g., a location of source 1002). Furthermore, the voice capable device may apply a virtual (e.g., spatial) source location to any sound, which can then be decoded by the human perceptual system as originating from a particular physical location.

The voice capable device may render a different first audio signal from the second audio signal so that the user perceives that the sound originates from a particular location (e.g., the spatial location). For example, a user may perceive that a sound originates out of a specific location when there are a particular time delay difference, intensity difference and phase difference between the first audio signal and the second audio signal. This time delay difference, intensity difference and phase difference may be computed at least in part by the spatial location for the communication and/or physical characteristics of the user (e.g., based on physical shape of the user's ears and pinnae and the presence of the user's head).

In some embodiments, the voice capable device causes the output of the spatial audio through a pair of speakers located in a known relationship to the ears of the user (e.g., a set of headphones having a first speaker in left ear 1010 and a second speaker in right ear 1008 of user 1012) and/or a sensor used for measuring the movement of the speakers (e.g., an inertial measurement unit). The voice capable device, when rendering the first audio signal for the first speaker and the second audio signal for the second speaker, may compute an ITD for the first signal relative to the second signal based on a selected spatial location for a message. For example, the voice capable device may determine the how long it will take for a first sound to reach a first ear of the recipient and how long it will take for a second sound to reach a second ear of the recipient. The voice capable device may compute the ITD based on the difference between the time it will take for the sound to reach the first ear (e.g., left ear 1010) as compared to the second ear (e.g., right ear 1008).

The voice capable device may compute an IID for the first signal relative to the second signal based on the selected spatial location. For example, the voice capable device may compute a first distance that a sound wave must travel from the spatial location to the first ear (e.g., left ear 1010) of user 1012 (e.g., user 108) and second distance to a second ear (e.g., right ear 1008) of user 1012. Based on the difference in distances, the voice capable device may compute an expected difference in intensity (e.g., the IID) for the first signal relative to the second signal.

The voice capable device may retrieve a first transfer function and/or a second transfer function based on the spatial location and/or based on physical characteristics of the user. For example, the first transfer function may represent a function of how a sound changes as it passes through a left ear of the recipient and the second transfer function may represent a second function of how a sound changes as it passes through a right ear of the recipient. In some embodiments, the voice capable device may shape the first signal based on the first transfer function and may shape the second signal based on the second transfer function. For example, the voice capable device may compute a modified first signal that is shaped based on the first transfer function (e.g., by applying a convolution operation to the signal) and may compute a modified second signal that is shaped based on the second transfer function (e.g., by applying a convolution operation to the signal). For example, the voice capable device may modify the first audio signal (e.g., with the message "Next meeting in 10 minutes" from communication 106) to approximate how the audio signal will change as it passes through a recipient's left ear (e.g., left ear 1010 of user 108/1012) and may modify the second audio signal to approximate how the audio signal will change as it passes through the recipient's right ear (e.g., right ear 1008 of user 108/1012).

The voice capable device may render the first audio signal and the second audio signal based on at least in part on further modifying the first and second signal using the ITD and/or the IID. In other words, the respective modified first signal and/or second signal may be augmented by adding a time delay or an intensity difference based on how such differences in time and intensity would occur if the sound were originating from the spatial location.

In some embodiments, the voice capable device may include a head tracking so that the frame of reference for the position of the audio signal does not change as the user rotates his or her head. For example, when the audio is output by two speakers that move with a user's head (e.g., headphones), the auditory frame of reference is effectively tied to the headphones: as the user's head turns, the sound source seems to move with the user rather than being fixed in the environment. Because the voice capable device may connect the frame of reference to the environment rather than the headphones, it is necessary to track the user's head position via head tracking (e.g., via an inertial measurement unit and/or simultaneous localization and mapping unit that that communicates with the voice capable device over a low latency channel). Based on the head tracking, the voice capable device may modify the ITD, IID, and HRTF for the first audio signal and the second audio signal to adjust for the frame of reference of the user's head within the environment as the user's head moves.

The voice capable device may cause the output of the first audio signal on a first speaker and the second audio signal on a second speaker. For example, the first speaker may be a left headphone bud, and the second speaker may be a right headphone bud. The voice capable device may cause the output of the first signal on the left headphone bud and the output of the second signal on the right headphone bud. Because the first signal and the second signal were rendered to include the time delay, magnitude difference, and phase difference that would occur for a sound originating at the spatial location, the user will perceive the output to have originated at the spatial location.

In some embodiments, the voice capable device may output spatial audio from an array of speakers (e.g., a speaker array comprising one or more speakers configured to output sounds in various directions). The voice capable device, via the speaker array, may play various tones to create an acoustic fingerprint of a room by playing tones at various frequencies from the one or more speakers, and then comparing the received echoes to the original, providing an acoustic map of the environment (e.g., environment 1000).

In some embodiments, the voice capable device may identify one or more discrete locations within environment 1000 to create virtual locations to place sounds. For example, the voice capable device may identify 24 discrete locations that are distributed across environment 1000. In some embodiments, the voice capable device identifies spatial locations for a communication based on a characteristic of the communication, such as a discrete location identified in the characteristic and/or a location identified in an audio stream of a media asset.

Figure 11:
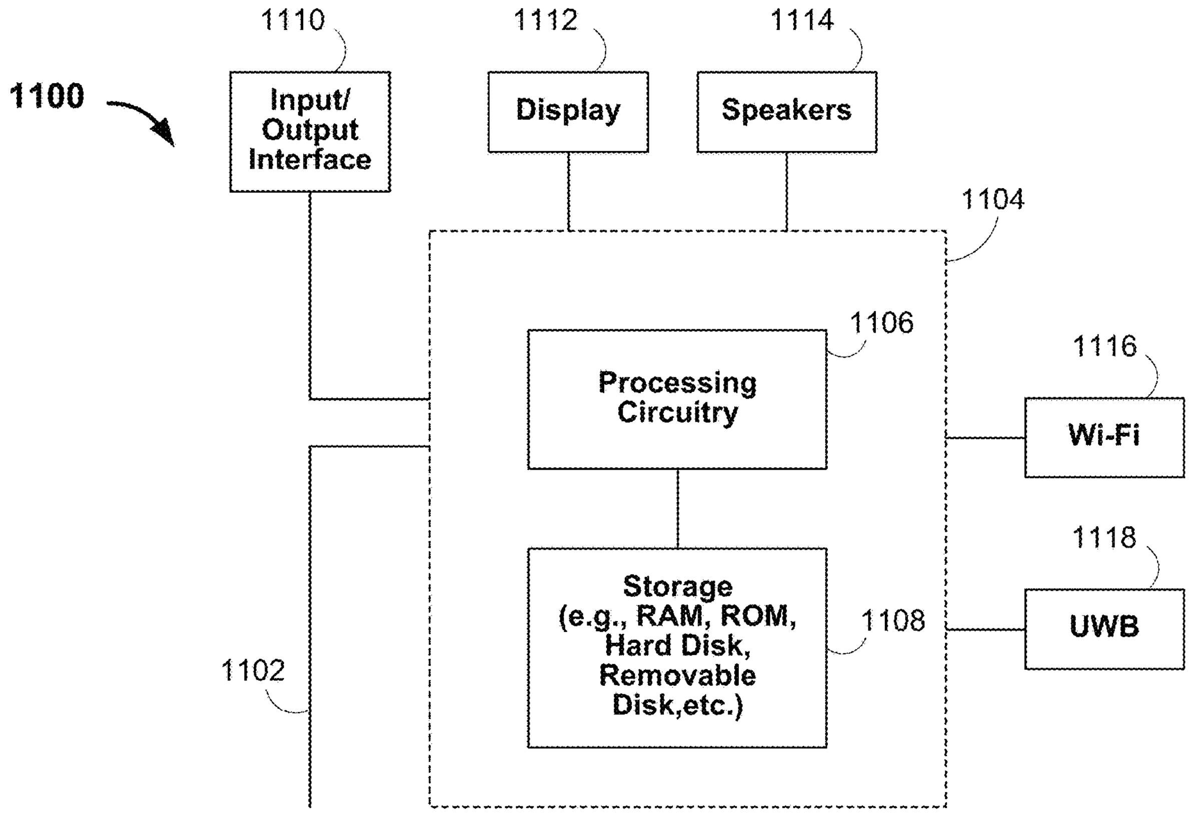
FIG. 11 depicts an example of a device, in accordance with some embodiments of the present disclosure.

FIG. 11 shows an illustrative, generalized embodiment of illustrative device 1100. Device 1100 is depicted having components that are internal and external to device 1100, for example, processing circuitry 1106, storage 1108, and communications circuitry, such as Wi-Fi radio 1116 and UWB radio 1118, which may each include one or more wireless antennas, input/output ("I/O") interface 1110, display 1112, speakers 1114 and communications path 1102. In some embodiments, each of the devices described herein (e.g., devices 402, 404, 406, 408, 410, 502, 504, 710, 808, and 1002) may comprise some or all of the components of device 1100.

I/O interface 1110 may provide content and data to control circuitry 1104 and control circuitry 1104 may be used to send and receive commands, requests, and other suitable data using I/O interface 1110. I/O interface 1110 may connect control circuitry 1104 (and specifically processing circuitry 1106) to one or more communications paths (e.g., Wi-Fi radio 1116, UWB radio 1118, path 1102). I/O functions may be provided by one or more of these communications paths, which may be shown as a single path in FIG. 11 to avoid overcomplicating the drawing.

Control circuitry 1104 may be based on any suitable processing circuitry such as processing circuitry 1106. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), GPUs, etc., and may include multiple parallel processing cores or redundant hardware. In some embodiments, processing circuitry 1106 may be distributed across multiple separate processors or processing units, for example, multiple of the same type of processors or multiple different processors. In some embodiments, control circuitry 1104 executes instructions stored in memory (i.e., storage 1108) and/or other non-transitory computer readable medium. Specifically, control circuitry 1104 may be instructed to perform the functions discussed above and below. For example, a device (e.g., any of devices 402, 404, 406, 408, 410, 502, 504, 710, 808, and 1002, and/or the devices discussed with respect to FIG. 12) may execute or comprise the code required to execute instructions associated with at least a portion of a voice capable device and may provide instructions to control circuitry 1104 to cause the output of spatialized audio (e.g., by causing the output of audio by any of devices 402, 404, 406, 408, 410, 502, 504, 710, 808, and 1002.

Figure 12:
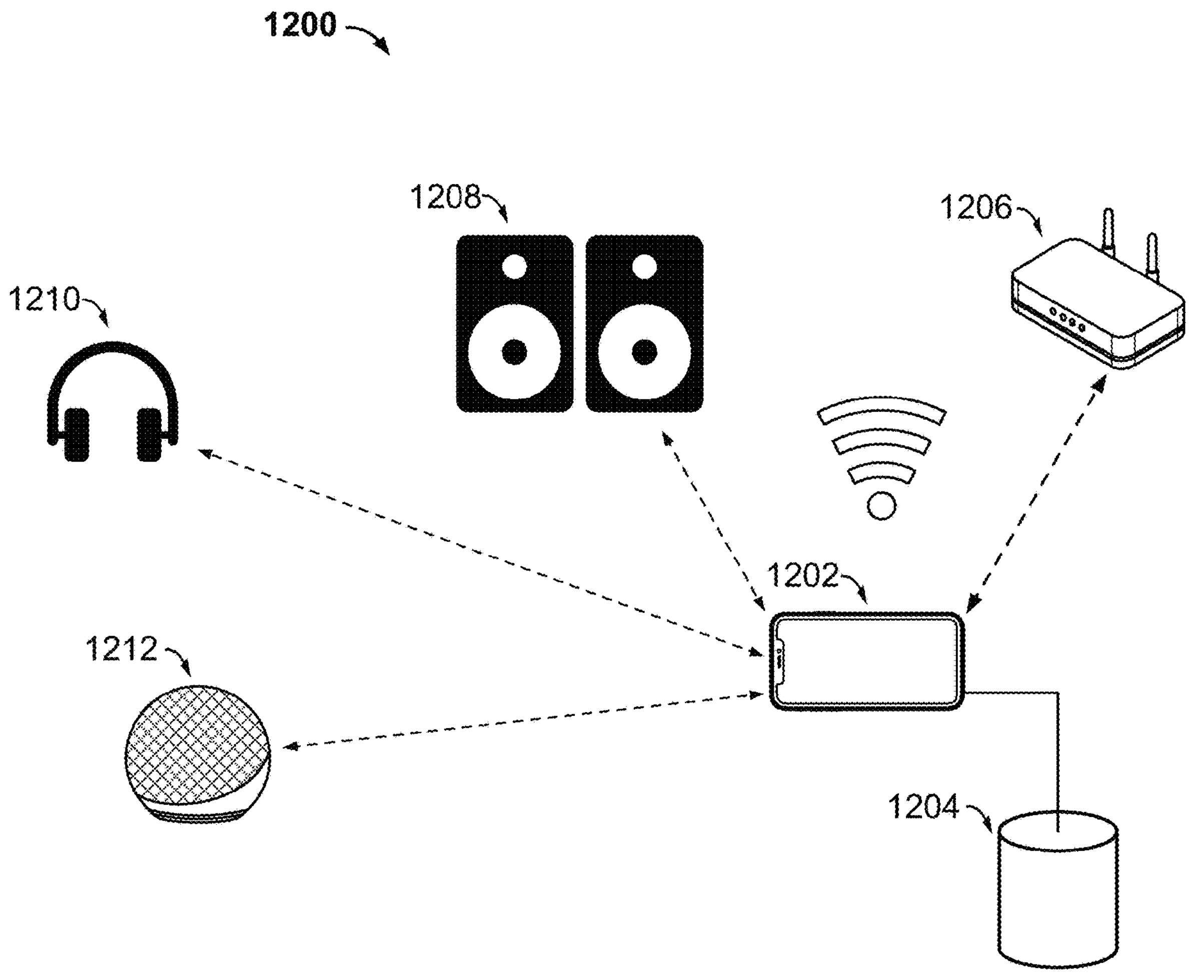
FIG. 12 depicts an example network configuration for multiple devices, in accordance with some embodiments of the present disclosure.

In some embodiments, control circuitry 1104 may include communications circuitry (e.g., Wi-Fi radio 1116 and/or UWB radio 1118 and/or a NFC radio) suitable for communicating with other networks (e.g., a LAN or a WAN), servers (e.g., a server accessed via the Internet or databases 300, 600, 902 and 904), or devices (e.g., any of devices 402, 404, 406, 408, 410, 502, 504, 710, 808, and 1002, and/or the devices discussed with respect to FIG. 12). The instructions for carrying out the above-mentioned functionality may be stored on database 902 and 904. The communications circuitry may include a modem, a fiber optic communications device, an Ethernet card, or a wireless communications device for communicating with other devices. Such communications may involve the Internet or any other suitable communications networks or paths. In addition, communications circuitry may include circuitry that enables peer-to-peer communication between devices (e.g., using UWB radio 1118).

Memory may be an electronic storage device provided as storage 1108 that is part of control circuitry 1104. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, or any other suitable fixed or removable storage devices, and/or any combination of the same. Storage 1108 may be used to store various types of data herein, such as instructions for performing the methods described herein, databases/code 300, 600, 902 and 904, and any metadata about media and/or information about devices. Nonvolatile memory may also be used (e.g., to launch a boot-up routine and other instructions). Cloud-based storage (e.g., storage accessed via the Internet) may be used to supplement storage 1108 or instead of storage 1108.

A user may send instructions to control circuitry 1104 using I/O interface 1110 using an external device such as a remote control, mouse, keyboard, touch screen, etc. In some embodiments, control circuitry 1104 correlates a user input with a location of a user interface element and performs an action based on the selected user interface element. Display 1112 may be provided as a stand-alone device or integrated with other elements of device 1100. For example, display 1112 may be a touchscreen or touch-sensitive display and may be combined with I/O interface 1110. Control circuitry 1104 may provide output via I/O interface 1110. In some embodiments, speakers 1114 may be connected to an output device, such as a pair of headphones, a single speaker, a speaker array, etc., to output sound to a user.

The systems and methods described herein may be implemented using any suitable architecture. For example, the systems and methods described herein may be a stand-alone application wholly implemented on device 1100. In such an approach, instructions of the application are stored locally (e.g., in storage 1108). In some embodiments, the systems and methods described herein may be a client-server-based application. Data for use by a thick or thin client implemented on device 1100 is retrieved on demand by issuing requests to a server remote from the device 1100. In some embodiments, the systems and methods provided herein are downloaded and interpreted or otherwise run by an interpreter or virtual machine (run by control circuitry 1104). In some embodiments, some functions are executed and stored on one device and some are executed and stored on a second device.

FIG. 12 depicts an example network configuration, in accordance with some embodiments of the present disclosure. Network configuration 1200 is shown depicting a plurality of devices, such as devices 1202, 1206, 1208, 1210, and 1212 and database 1204. In some embodiments, the voice capable device comprises some or all of the devices depicted in FIG. 12, where processes of the voice capable device are at least partially implemented on some or all of the devices. In some embodiments, database 1204 comprises database 600, 902 and/or 904. In some embodiments, device 1210 may be a pair of headphones worn by a user, device 1208 may be a speaker array configured to output spatialized audio in an environment, device 1206 may be a router configured to connect devices within an environment over a Wi-Fi connection, device 1212 may be a smart speaker (e.g., a smart speaker that at least partially implements an application described herein as a voice capable device). As depicted in network configuration 1200, device 1202 may utilize a wireless radio (e.g., UWB radio 1118 or Wi-Fi radio 1116) of network device 1202 to communicate and discover a plurality of devices, such as devices 1206, 1208, 1210 and 1212. For example, device 1202 may perform a ranging and discovery protocol with between UWB radio 1118 of network device 1202 and UWB radio 1118 of device 1212. In some embodiments, device 1202 may transmit the results of the ranging and discovery protocol to database 1204. For example, device 1202 may transmit, over Wi-Fi radio 1116, the device names, identifiers (e.g., IP addresses), locations, name etc. for storage on database 1210 (e.g., which may comprise database 600, 902 and/or 904).

Figure 13:
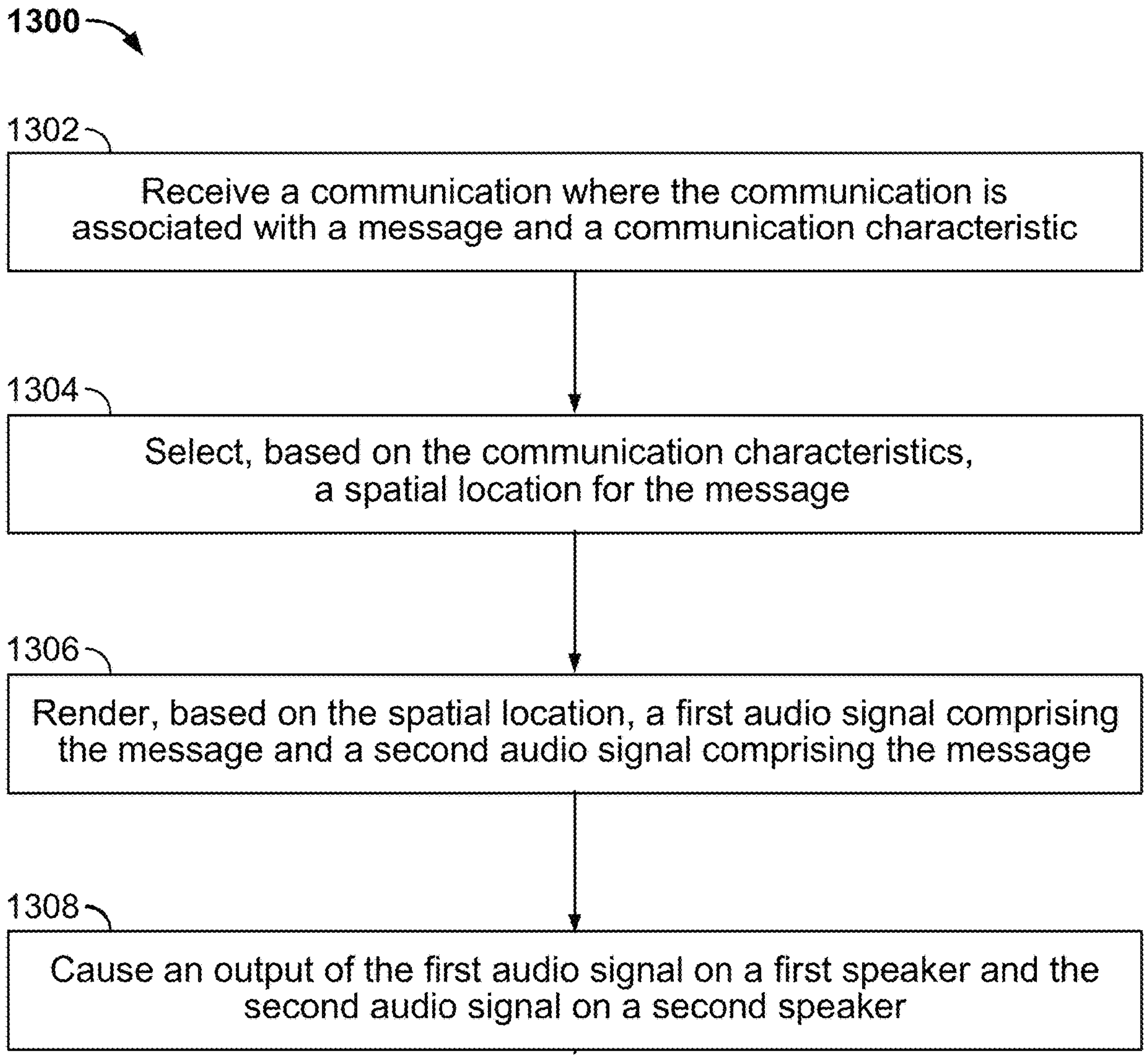
FIG. 13 is a flowchart of an example process for causing output of a spatial audio signal, in accordance with some embodiments of this disclosure.

FIG. 13 is a flowchart of an example process for causing output of a spatial audio signal, in accordance with some embodiments of this disclosure. Process 1300 begins at 1302, where a voice capable device, using control circuitry, such as control circuitry 1104, receives a communication where the communication is associated with a message and a communication characteristic. For example, control circuitry 1104 may receive a communication, such as any of communications 202, 204 and 206 depicted in FIG. 2. The communication may be associated with a message (e.g., "New email from Tony" of communication 204) and may be associated with a communication characteristic (e.g., an originating application, a priority, a privacy, etc.).

At 1304, control circuitry 1104 selects, based on the communication characteristic, a spatial location for the message. For example, control circuitry 1104 may select a spatial location for the message "New email from Tony" by retrieving and/or inspecting rules, such as the example rules depicted in FIG. 3, which may be stored local to control circuitry 1104 (e.g., on storage 1108) or remote to control circuitry 1104 (e.g., on storage 1108 of a server located over the Internet). Control circuitry 1104 may apply the retrieved rule (e.g., rule 302) and based on comparing the communication characteristic (e.g., an Application "Mail") to the rule for the "Mail" application (e.g., rule 302) and may determine based on the rule, a spatial location to output the message (e.g., 90 degrees from a user and 5 meters from the user). Although the rules depicted in FIG. 3 are relative to a position of the user, in some instances, absolute positions may be used.

At 1306, control circuitry 1104 renders, based on the spatial location, a first audio signal comprising the message and a second audio signal comprising the message. For example, control circuitry 1104 may determine that the user is wearing a pair of headphones that are compatible with spatial audio (e.g., device 1210). Based on the detecting, control circuitry 1104 may generate a first audio signal for the user's right ear and a second audio signal for the user's left ear. A process for rendering an audio signal using head tracking is discussed further below with respect to FIG. 14.

At 1308, control circuitry 1104 causes the output of the first audio signal on a first speaker and the second audio signal on a second speaker. For example, when the audio output device is a pair of headphones (e.g., device 1210), control circuitry 1104 may cause the output of the first audio signal on a left earbud of the headphones and may cause the output of the second audio signal on a right earbud of the headphones. Control circuitry 1104 may cause the output by, for example, transmitting the audio stream to each of the individual headphones.

It is contemplated that the processes or descriptions of FIG. 13 may be used with any other embodiment of this disclosure. In addition, the descriptions described in relation to the process of FIG. 13 may be done in alternative orders or in parallel to further the purpose of this disclosure.

Figure 14:
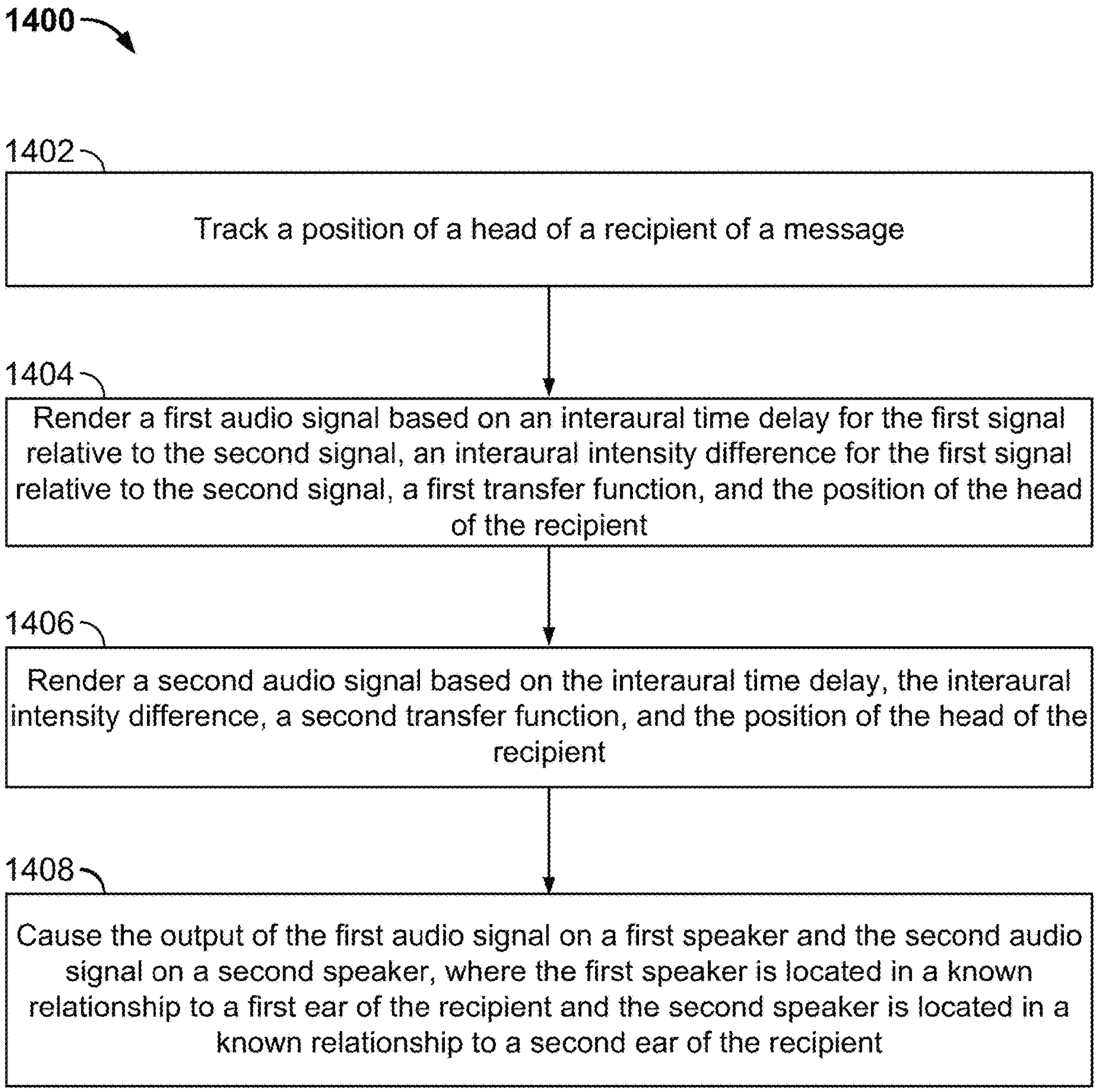
FIG. 14 is a flowchart of an example process for tracking the head of a recipient of a message, in accordance with some embodiments of this disclosure.

FIG. 14 is a flowchart of an example process for tracking the head of a recipient of a message, in accordance with some embodiments of this disclosure. Process 1400 begins at 1402, where a voice capable device, using control circuitry, such as control circuitry 1104, tracks a head position of a recipient of a message. For example, the voice capable device may be at least in part implemented on an audio device worn by the user such as a pair of headphones (e.g., device 1210). The audio device may comprise at least one of an inertial measurement unit and/or simultaneous localization and mapping unit that communicates with the voice capable device over a low latency channel to provide changes in the orientation of the head of the user.

At 1404, control circuitry 1104 renders a first audio signal based on an interaural time delay for the first signal relative to the second signal, an interaural intensity difference for the first signal relative to the second signal, a first transfer function, and the position of the head of the recipient. For example, control circuitry 1104 may compute a delay difference and an intensity difference. Control circuitry 1104 may select a transfer function that approximates how the sound would be shaped by the user's pinnae and the presence of the user's head itself to select a HRTF. Control circuitry 1104 may perform text to speech on the message to render an audio signal and may then generate a first audio signal for the user's left ear based on the ITD, the IID, the HRTF and the position of the head. Accordingly, control circuitry 1104 generates a first audio that mimics the audio signal the user would hear at the user's left ear if the source of the sound were coming from an object located at the spatial location.

At 1406, control circuitry 1104 renders a second audio signal based on the interaural time delay, the interaural intensity difference, a second transfer function, and the position of the head of the recipient. For example, control circuitry 1104 may apply the ITD, the IID, the HRTF and the position of the head to render a second audio signal that the user would hear at the user's right ear if the source of the sound were, as perceived by the user, coming from an object located at the spatial location.

At 1408, control circuitry 1104 causes the output of the first audio signal on a first speaker and the second audio signal on a second speaker, where the first speaker is located in a known relationship to a first ear of the recipient and the second speaker is located in a known relationship to a second ear of the recipient. For example, control circuitry 1104 may transmit the first audio signal to a left earbud of headphone 1210 and may transmit the second audio signal to a right earbud of headphone 1210. Both of the headphones may be worn by the user directly or close to his or her ears (e.g., left ear 1010 and right ear 1008).

It is contemplated that the processes or descriptions of FIG. 14 may be used with any other embodiment of this disclosure. In addition, the descriptions described in relation to the process of FIG. 14 may be done in alternative orders or in parallel to further the purpose of this disclosure.

Figure 15:
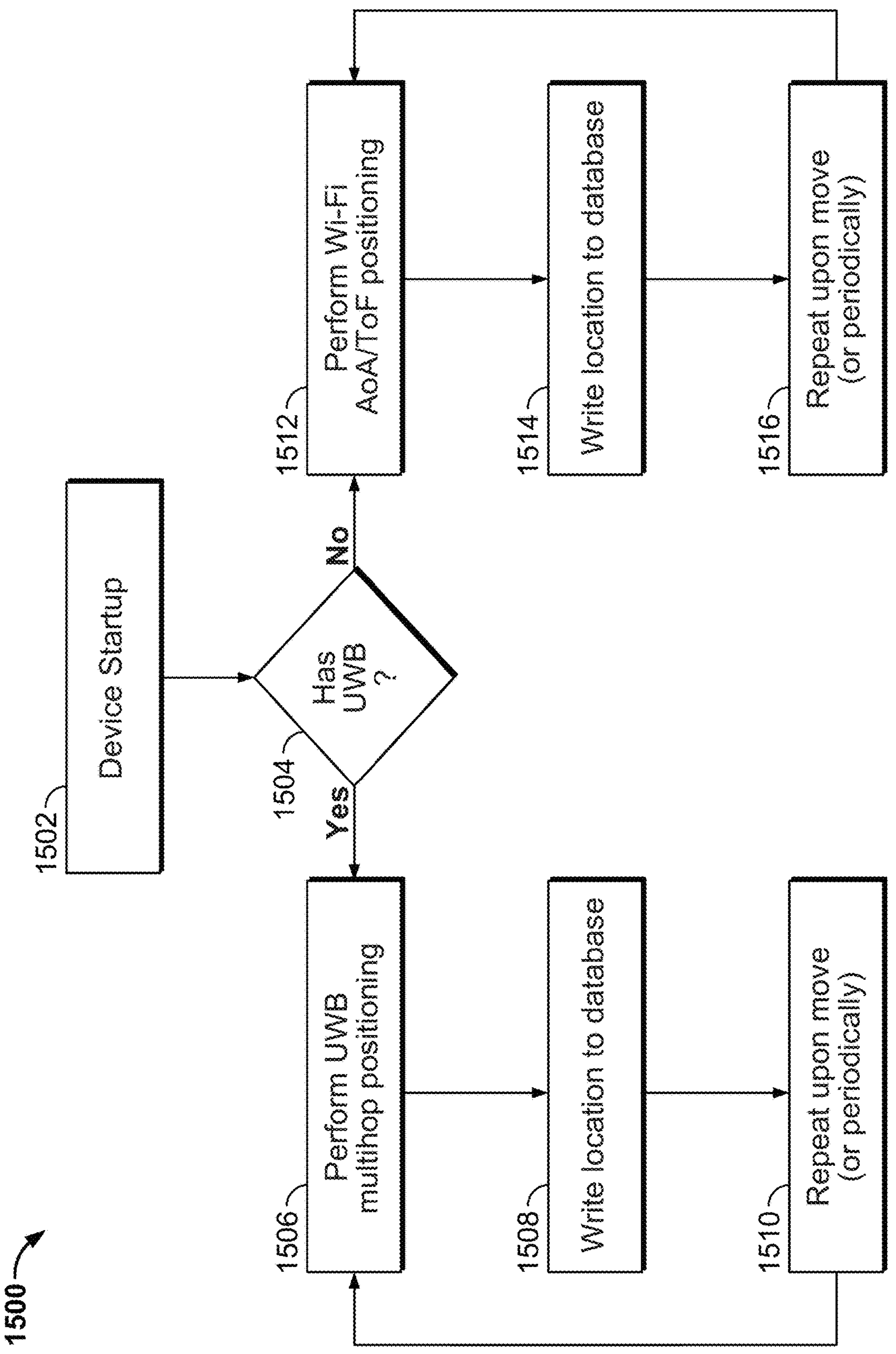
FIG. 15 is a flowchart of an example process for identifying a location of a device, in accordance with some embodiments of this disclosure.

FIG. 15 is a flowchart of an example process for identifying a location of a device, in accordance with some embodiments of this disclosure. Process 1500 begins at 1502, where a voice capable device, using control circuitry, such as control circuitry 1104, starts up (e.g., is powered up). If, as determined at 1504, the device does not have UWB capabilities, control circuitry 1104 proceeds to 1512, where control circuitry 1104 performs a Wi-Fi positing process (e.g., by determining an angle of attack for a Wi-Fi signal and time of flight for the Wi-Fi signal using Wi-Fi radio 1116). If the device does have UWB capabilities, control circuitry 1104 proceeds to 1506, where control circuitry 1104 performs a UWB positioning process, as discussed above with respect to FIG. 4 (e.g., using UWB radio 1118). After control circuitry 1104 performs the positioning process (either using Wi-Fi radio 1116 or UWB radio 1118) control circuitry 1104 writes the location to a database (e.g., database 600) at 1508 and 1514, respectively. At 1510 and 1516, respectively, control circuitry 1104 may either periodically repeat the positioning process or may restart the positioning process upon detecting movement of the device (e.g., by monitoring a movement sensor, such as a gyroscope or an accelerometer of the device).

It is contemplated that the processes or descriptions of FIG. 15 may be used with any other embodiment of this disclosure. In addition, the descriptions described in relation to the process of FIG. 15 may be done in alternative orders or in parallel to further the purpose of this disclosure.

Figure 16:
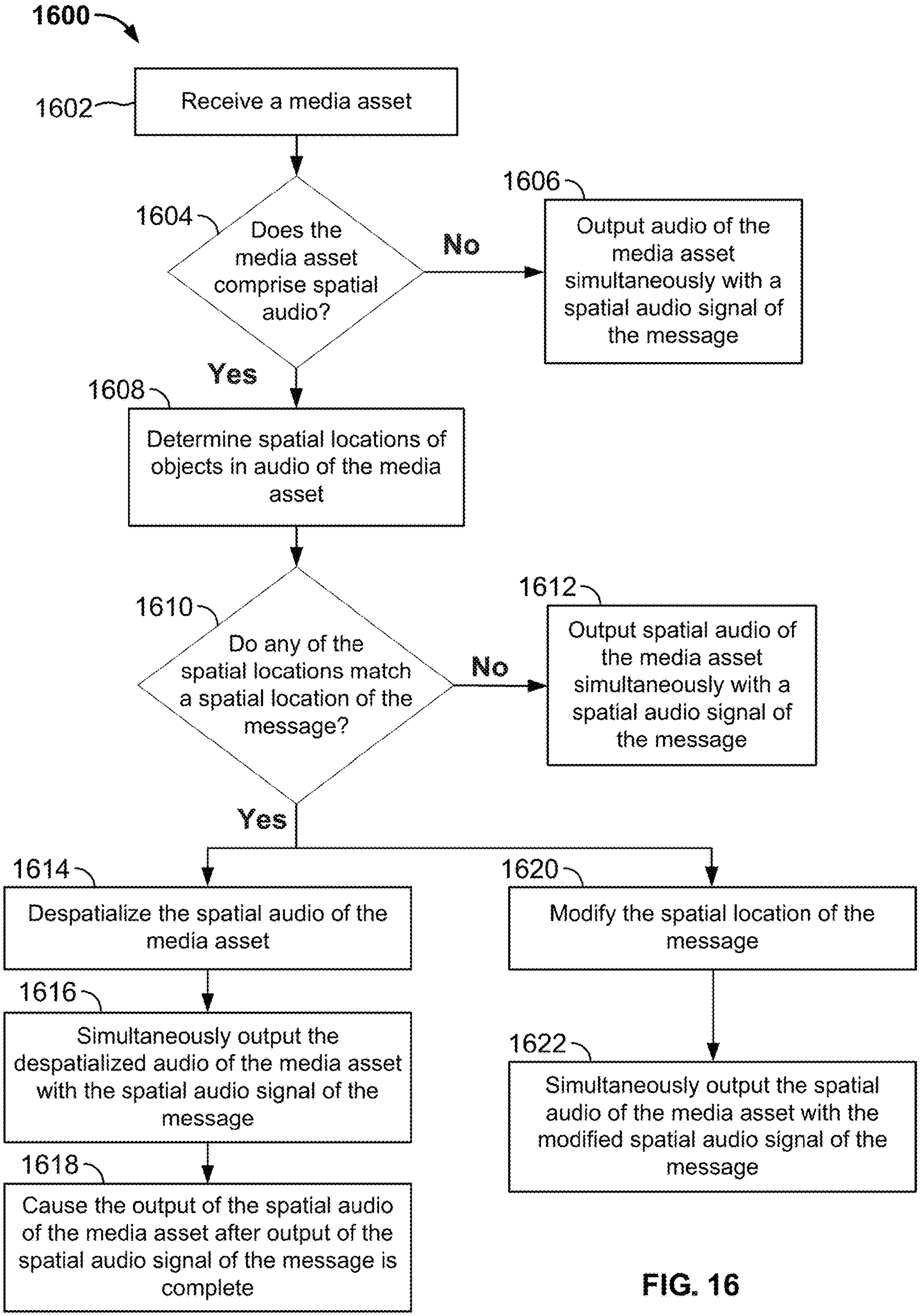
FIG. 16 is a flowchart of an example process for simultaneously causing output of media and a message, in accordance with some embodiments of this disclosure.

FIG. 16 is a flowchart of an example process for simultaneously causing output of a media asset and a message, in accordance with some embodiments of this disclosure. Process 1600 begins at 1602, where a voice capable device, using control circuitry, such as control circuitry 1104, receives a media asset. For example, control circuitry 1104 may either receive a media asset (e.g., a movie) itself or may receive an indication that a media asset is being output by an audio device, such as any of devices 1212, 1210, or 1208.

At 1604, control circuitry 1104 determines whether the media asset comprises spatial audio. For example, control circuitry 1104 may request, receive and/or inspect metadata associated with the media asset to determine a number of audio channels associated with the media asset. If the media asset comprises, for example, only two audio channels, control circuitry 1104 may determine that the media asset does not comprise spatial audio and may proceed to 1606, where control circuitry 1104 outputs audio of the media asset simultaneously with a spatial audio signal of the message (e.g., because the user can selectively tune in to the audio of the message when the audio of the message is spatialized).

If the media asset does comprise spatial audio (as determined by control circuitry 1104), control circuitry 1104 proceeds to 1608, where control circuitry 1104 determines spatial locations of objects in the audio of the media asset. For example, the media asset (e.g., a movie) may contain an explosion noise that is spatially located behind the user and a talking voice that is spatially located in front of the user.

At 1610, control circuitry 1104 determines whether any of the spatial locations in the media asset match the spatial location for the message. For example, control circuitry 1104 may determine whether a spatial location for the message matches the spatial location for either the explosion or the talking voice in the media asset. When the spatial locations do not match (e.g., "No" at 1610, as determined by control circuitry 1104), control circuitry 1104 outputs the spatial audio of the media asset simultaneously with the spatial audio of the message (e.g., because the spatial locations do not conflict, the user will be able to selectively tune in to the message or the media asset without requiring interruption of the playing or presentation of the media asset).

If a spatial location of the message conflicts with a spatial location from the audio of the media asset (e.g., "Yes" at 1610), control circuitry 1104 may, at 1620, modify the spatial location of the message at 1620 to no longer conflict with a spatial location for audio in the media asset and may, at 1622, simultaneously output the spatial audio of the media asset with the modified spatial audio signal for the message.

If a spatial location of the message conflicts with a spatial location from the audio of the media asset, control circuitry 1104 may, at 1614, despatialize the spatial audio of the media asset (e.g., render a stereo version of the audio of the media asset), simultaneously output, at 1616, the despatialize audio of the media asset with the spatial audio signal of the message (e.g., output the stereo audio and the spatial audio for the message), and may cause the output of the spatial audio of the media asset after output of the spatial audio signal of the message is complete (e.g., to resume play of the spatial audio of the media asset when the conflict with the spatial location for the message is no longer present).

It is contemplated that the processes or descriptions of FIG. 16 may be used with any other embodiment of this disclosure. In addition, the descriptions described in relation to the process of FIG. 16 may be done in alternative orders or in parallel to further the purpose of this disclosure.

Figure 17:
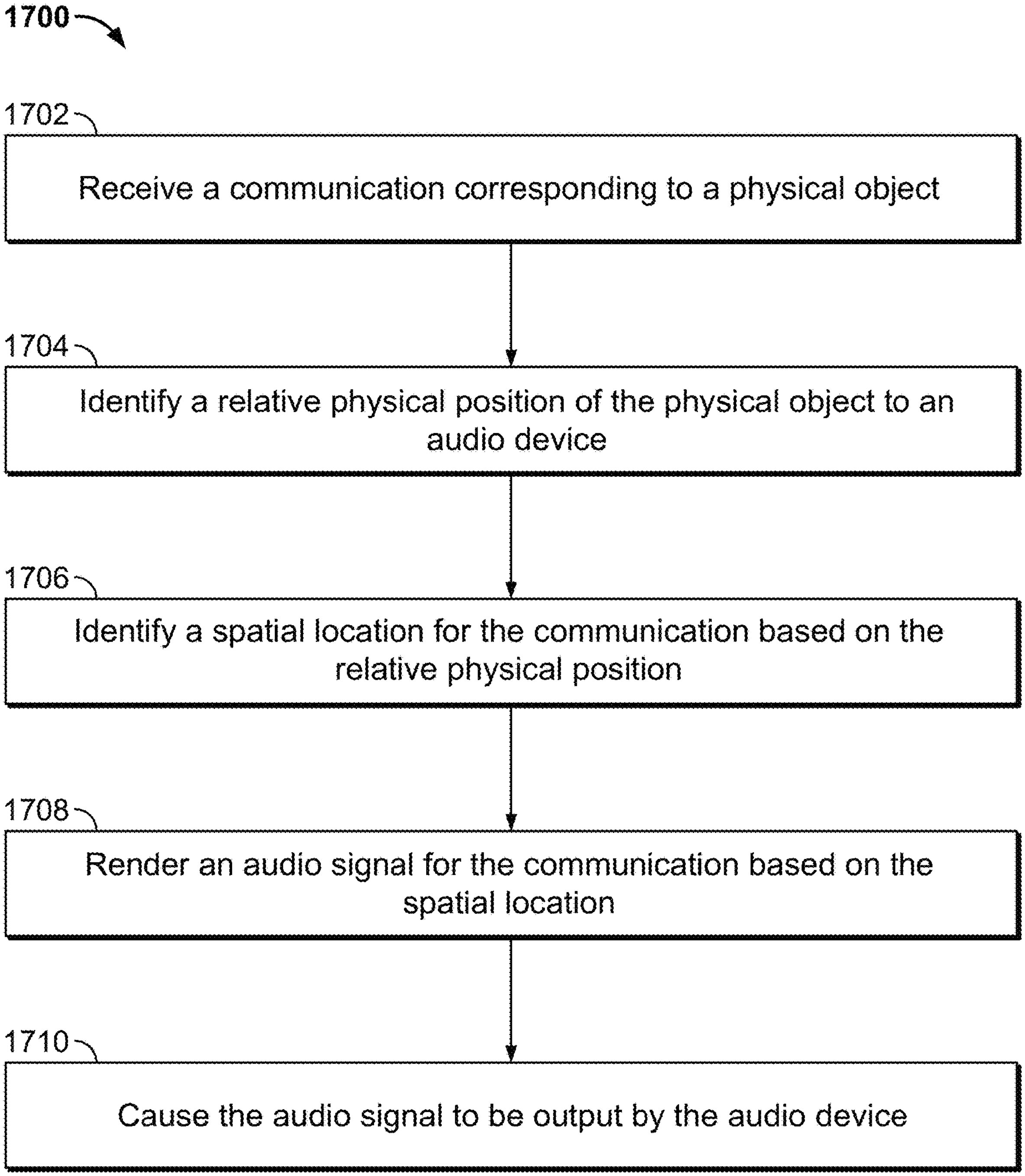
FIG. 17 is a flowchart of an example process for causing output of spatial audio corresponding to a physical object, in accordance with some embodiments of this disclosure.

FIG. 17 is a flowchart of an example process for causing output of spatial audio corresponding to a physical object, in accordance with some embodiments of this disclosure. Process 1700 begins at 1702, where a voice capable device, using control circuitry, such as control circuitry 1104, receives a communication corresponding to a physical object. For example, control circuitry 1104 may receive a communication comprising a message and a communication characteristic. The message may include a timer notification (e.g., an alarm sound) and the communication characteristic may identify a physical object associated with the timer (e.g., a kitchen stove). An example communication is depicted in FIG. 2 and discussed further above.

At 1704, control circuitry 1104 identifies a relative physical position of the physical object to an audio device (e.g., the voice capable device). For example, control circuitry 1104 may determine a relative physical position of the physical object using the wireless positioning discussed in relation to FIG. 4, by using the enrollment process discussed in relation to FIG. 5, and/or by retrieving a location for the physical object from a database (e.g., database 600).

At 1706, control circuitry 1104 identifies a spatial location for the communication based on the relative physical position. For example, control circuitry 1104 determines a spatial location so that, as perceived by a recipient (e.g., user) of the message, the message seems to originate from the physical location of the physical object.

At 1708, control circuitry 1104 renders an audio signal for the communication based on the spatial location. For example, control circuitry 1104 may render the audio signal using the process described with respect to FIG. 14 to render an audio signal that seems to originate from a physical location corresponding to the physical object.

At 1710, control circuitry 1104 causes the audio signal to be output by the audio device. For example, control circuitry 1104 may transmit the audio signal to any of devices 1210, 1208, and 1212 or may output the audio signal from a speaker, such as speakers 1114.

It is contemplated that the processes or descriptions of FIG. 17 may be used with any other embodiment of this disclosure. In addition, the descriptions described in relation to the process of FIG. 17 may be done in alternative orders or in parallel to further the purpose of this disclosure.

Figure 18:
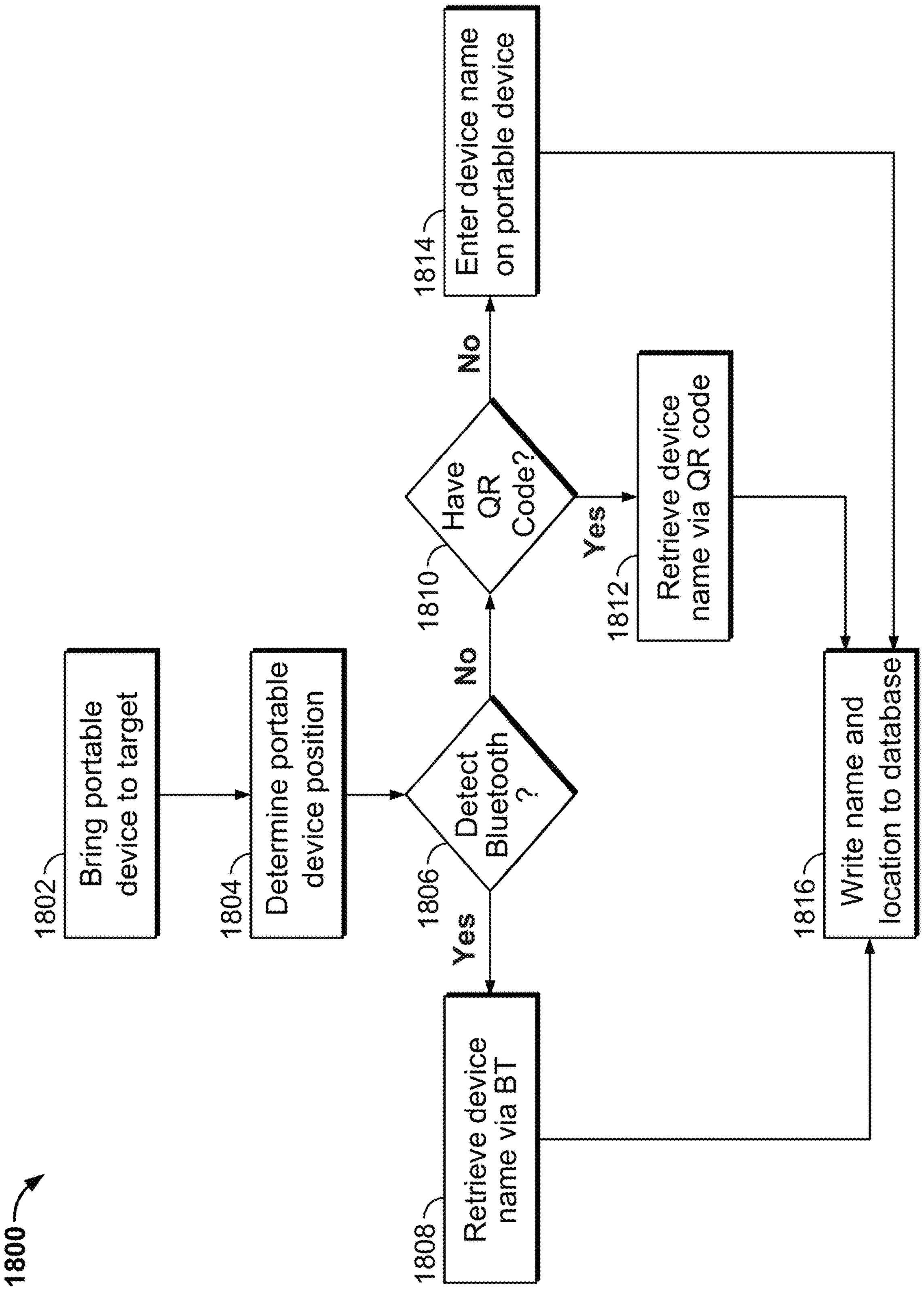
FIG. 18 is a flowchart of an example process for registering a location of an object using a device, in accordance with some embodiments of this disclosure.

FIG. 18 is a flowchart of an example process for registering a location of an object (e.g., a physical object that cannot independently provide its location to a voice capable device) using a device (e.g., a portable device), in accordance with some embodiments of this disclosure. Process 1800 begins at 1802 where a voice capable device (e.g., a voice capable device at least partly implemented on a portable device), using control circuitry, such as control circuitry 1104, is brought by a user to a target device, such as a physical device. For example, a user may bring their cell phone to a front of a thermostat and may select an option to register the location of the portable device as the location for a physical object.

At 1804, control circuitry 1104 determines a position of the portable device. For example, control circuitry 1104 may use the UWB ranging protocol to identify a position of the portable device (e.g., a cell phone) relative a sound output device, such as a speaker array, or a generally fixed point in the user's environment, such as a router (e.g., router 1206) in the user's home. An example of identifying a relative position of a device using a UWB ranging protocol is discussed above with respect to FIG. 4.

At 1806, control circuitry 1104 determines whether the target has Bluetooth or other wireless capabilities (e.g., NFC). If the physical object does have wireless capabilities (e.g., Bluetooth capabilities-"Yes" at 1806), control circuitry 1104 retrieves the device name and/or other information about the object via the Bluetooth connection at 1808. If the object does not have Bluetooth (or other wireless capabilities) (e.g., "No" at 1806), the process proceeds to 1810. If the object has or can display a QR code (e.g., "Yes" at 1810), control circuitry 1104 may retrieve device information, such as a name, via the QR code at 1812. In some embodiments, control circuitry 1104 may receive data entered by the user on the portable device (e.g., via I/O path 1110) at 1814. In each of the examples, control circuitry 1104 stores the received information about the object to a database (e.g., database 600) at 1816. By storing the location of the object in a database, control circuitry 1104 may retrieve the location from the database at a later time when control circuitry 1104 is rendering audio as to appear to originate form a location of the object.

It is contemplated that the processes or descriptions of FIG. 18 may be used with any other embodiment of this disclosure. In addition, the descriptions described in relation to the process of FIG. 18 may be done in alternative orders or in parallel to further the purpose of this disclosure.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for enhanced audio delivery, the method comprising:

receiving a communication, wherein the communication is associated with a message and a communication characteristic;

selecting, based on the communication characteristic, a spatial location for the message at least in part by:

identifying a location-based rule that corresponds to the communication characteristic, from a plurality of location-based rules stored in a database; and determining the spatial location based on the least one of a spatial direction or a spatial distance associated with the identified location-based rule;

rendering, based at least in part on the spatial location, a first audio signal and a second audio signal comprising the message, wherein the first audio signal differs from the second audio signal; and causing an output of the first audio signal on a first speaker and the second audio signal on a second speaker.

2. The method of claim 1, wherein the communication characteristic comprises at least one of a type of the communication, an origin device of the communication, an origin application of the communication, a priority of the communication, a time sensitivity for the communication, or a privacy level for the communication.

3. The method of claim 1, further comprising selecting, based on the communication characteristic, at least one of a volume, a tone, or a speaking cadence of the first audio signal and the second audio signal.

4. The method of claim 1, wherein the first speaker is configured to be worn on a first ear of a recipient of the message and the second speaker is configured to be worn on a second ear of the recipient.

5. The method of claim 4, further comprising:

tracking the position of a head of the recipient; and wherein rendering the first audio signal and the second audio signal is performed based at least on the position of the head of the recipient.

6. The method of claim 1, wherein rendering the first audio signal and the second audio signal comprises:

rendering the first audio signal based on one or more of an interaural time delay for the first signal relative to the second signal, an interaural intensity difference for the first signal relative to the second signal, or a head related transfer function; and rendering the second audio signal based on one or more of the interaural time delay, the interaural intensity difference, or the head related transfer function.

7. The method of claim 1, further comprising:

determining, based on the communication characteristic, that the communication corresponds to a physical object;

identifying a physical location for the physical object; and wherein the selecting the spatial location for the message is performed based on the physical location of the physical object.

8. The method of claim 1, where the database comprises a plurality of location-based rules that each correspond to a communication characteristic of a plurality of communication characteristics, and wherein each of the location-based rules is associated with at least one of a respective spatial direction or a respective spatial distance.

9. The method of claim 1, wherein selecting, based on the communication characteristic, the spatial location for the message, comprises:

determining that at least one of first speaker or the second speaker is outputting a media asset;

determining whether any spatial location of a plurality of spatial locations corresponding to the media asset substantially match the spatial location for the message; and in response to determining that a spatial location of the plurality of spatial locations corresponding to the media asset substantially match the spatial location for the message, modifying the spatial location for the message.

10. The method of claim 1, wherein the first speaker and the second speaker are one or more speakers in a speaker array, and wherein the spatial location for the message is further selected based on a physical location of a recipient of the message.

11. A system for enhanced audio delivery, the system comprising control circuitry configured to:

receive a communication, wherein the communication is associated with a message and a communication characteristic;

select, based on the communication characteristic, a spatial location for the message at least in part by:

identifying a location-based rule that corresponds to the communication characteristic, from a plurality of location-based rules stored in a database; and determining the spatial location based on the least one of a spatial direction or a spatial distance associated with the identified location-based rule;

render, based at least in part on the spatial location, a first audio signal and a second audio signal comprising the message, wherein the first audio signal differs from the second audio signal; and cause an output of the first audio signal on a first speaker and the second audio signal on a second speaker.

12. The system of claim 11, wherein the communication characteristic comprises at least one of a type of the communication, an origin device of the communication, an origin application of the communication, a priority of the communication, a time sensitivity for the communication, or a privacy level for the communication.

13. The system of claim 11, wherein the control circuitry is further configured to select, based on the communication characteristic, at least one of a volume, a tone, or a speaking cadence of the first audio signal and the second audio signal.

14. The system of claim 11, wherein the first speaker is configured to be worn on a first ear of a recipient of the message and the second speaker is configured to be worn on a second ear of the recipient.

15. The system of claim 14, wherein the control circuitry is further configured to:

track the position of a head of the recipient; and wherein rendering the first audio signal and the second audio signal is performed, by the control circuitry, based at least on the position of the head of the recipient.

16. The system of claim 11, wherein the control circuitry is further configured, when rendering the first audio signal and the second audio signal to:

render the first audio signal based on one or more of an interaural time delay for the first signal relative to the second signal, an interaural intensity difference for the first signal relative to the second signal, or a head related transfer function; and render the second audio signal based on one or more of the interaural time delay, the interaural intensity difference, or the head related transfer function.

17. The system of claim 11, wherein the control circuitry is further configured to:

determine, based on the communication characteristic, that the communication corresponds to a physical object;

identify a physical location for the physical object; and wherein, the control circuitry is further configured, when selecting the spatial location for the message, to select the spatial location for the message based on the physical location of the physical object.

18. The system of claim 11, wherein the database comprises a plurality of location-based rules that each correspond to a communication characteristic of a plurality of communication characteristics, and wherein each of the location-based rules is associated with at least one of a respective spatial direction or a respective spatial distance.

19. The system of claim 11, wherein the control circuitry is further configured, when selecting, based on the communication characteristic, the spatial location for the message, to:

determine that at least one of first speaker or the second speaker is outputting a media asset;

determine whether any spatial location of a plurality of spatial locations corresponding to the media asset substantially match the spatial location for the message; and in response to determining that a spatial location of the plurality of spatial locations corresponding to the media asset substantially match the spatial location for the message, modify the spatial location for the message.

20. The system of claim 11, wherein the first speaker and the second speaker are one or more speakers in a speaker array, and wherein the spatial location for the message is further selected, by the control circuitry, based on a physical location of a recipient of the message.

* * * * *